US010638491B2

(12) United States Patent
Fujishiro et al.

(10) Patent No.: US 10,638,491 B2
(45) Date of Patent: Apr. 28, 2020

(54) RADIO TERMINAL

(71) Applicant: KYOCERA CORPORATION, Kyoto (JP)

(72) Inventors: Masato Fujishiro, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 19 days.

(21) Appl. No.: 15/808,024

(22) Filed: Nov. 9, 2017

(65) Prior Publication Data
US 2018/0070367 A1   Mar. 8, 2018

Related U.S. Application Data

(60) Provisional application No. 62/165,315, filed on May 22, 2015, provisional application No. 62/162,166, filed on May 15, 2015.

(51) Int. Cl.
| | |
|---|---|
| *H04W 72/12* | (2009.01) |
| *H04W 72/04* | (2009.01) |
| *H04W 72/14* | (2009.01) |
| *H04W 72/08* | (2009.01) |
| *H04W 52/02* | (2009.01) |

(52) U.S. Cl.
CPC ..... *H04W 72/085* (2013.01); *H04W 52/0206* (2013.01); *H04W 52/0216* (2013.01); *H04W 72/0446* (2013.01); *H04W 72/12* (2013.01); *H04W 72/1231* (2013.01); *H04W 72/14* (2013.01); *H04W 72/042* (2013.01); *H04W 72/0413* (2013.01); *Y02D 70/00* (2018.01); *Y02D 70/10* (2018.01); *Y02D 70/12* (2018.01); *Y02D 70/126* (2018.01); *Y02D 70/1242* (2018.01); *Y02D 70/1262* (2018.01); *Y02D 70/24* (2018.01)

(58) Field of Classification Search
CPC .......................... H04W 72/0413; H04W 72/08
USPC .................................................. 370/252–339
See application file for complete search history.

(56) References Cited

U.S. PATENT DOCUMENTS

| | | | |
|---|---|---|---|
| 2012/0314680 A1* | 12/2012 | Kela | H04W 72/042 370/329 |
| 2013/0343355 A1 | 12/2013 | Barbieri et al. | |
| 2015/0208366 A1* | 7/2015 | Papasakellariou | H04W 74/0833 370/311 |

(Continued)

FOREIGN PATENT DOCUMENTS

| | | |
|---|---|---|
| WO | 2014097357 A1 | 6/2014 |
| WO | 2015/047145 A1 | 4/2015 |

OTHER PUBLICATIONS

European Search Report issued by the European Patent Office dated Mar. 27, 2018, which corresponds to EP16796317.2-1219 and is related to U.S. Appl. No. 15/808,024.

(Continued)

*Primary Examiner* — Iqbal Zaidi
(74) *Attorney, Agent, or Firm* — Studebaker & Brackett PC

(57) ABSTRACT

A radio terminal according to an embodiment is a terminal to which radio resources are allocated from a base station by Semi-Persistent Scheduling (SPS). The radio terminal includes a controller configured to perform processing of transmitting, to the base station, an explicit SPS release notice for releasing the radio resources allocated by the SPS.

3 Claims, 15 Drawing Sheets

(56) References Cited

U.S. PATENT DOCUMENTS

2015/0289268 A1    10/2015  Ohta et al.
2016/0242176 A1*   8/2016  Sun .................. H04W 72/0446

OTHER PUBLICATIONS

International Search Report issued in PCT/JP2016/063713; dated Jul. 26, 2016.
Nokia Siemens Networks, "Padding BSR and Empty Transmission Buffers", 3GPP TSG-RAN WG2 Meeting #71, R2-104307, Madrid, Spain, Aug. 23-27, 2010, pp. 2-5.
Nokia Siemens Networks, "Padding BSR and Empty Transmission Buffers", 3GPP TSG-RAN WG2 Meeting #71bis, R2-105318, Xian, China, Oct. 11-15, 2010, pp. 2-5.

* cited by examiner

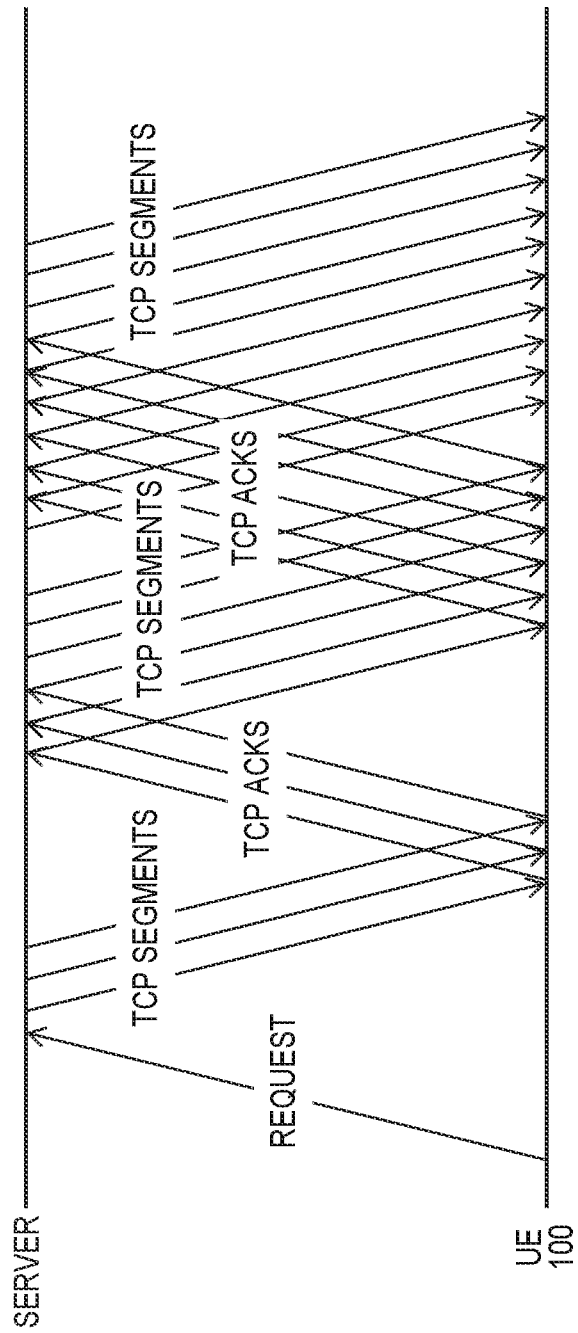

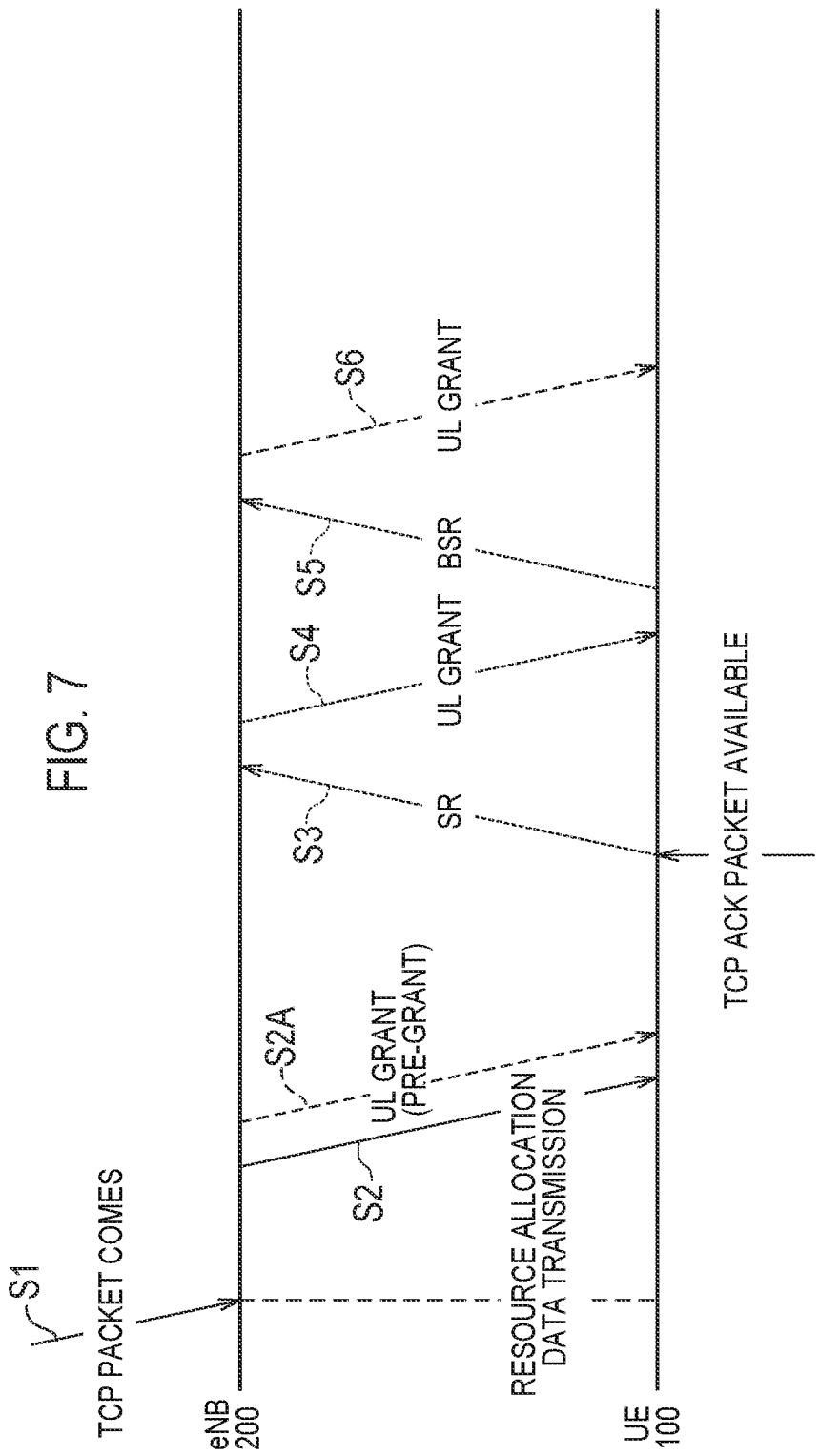

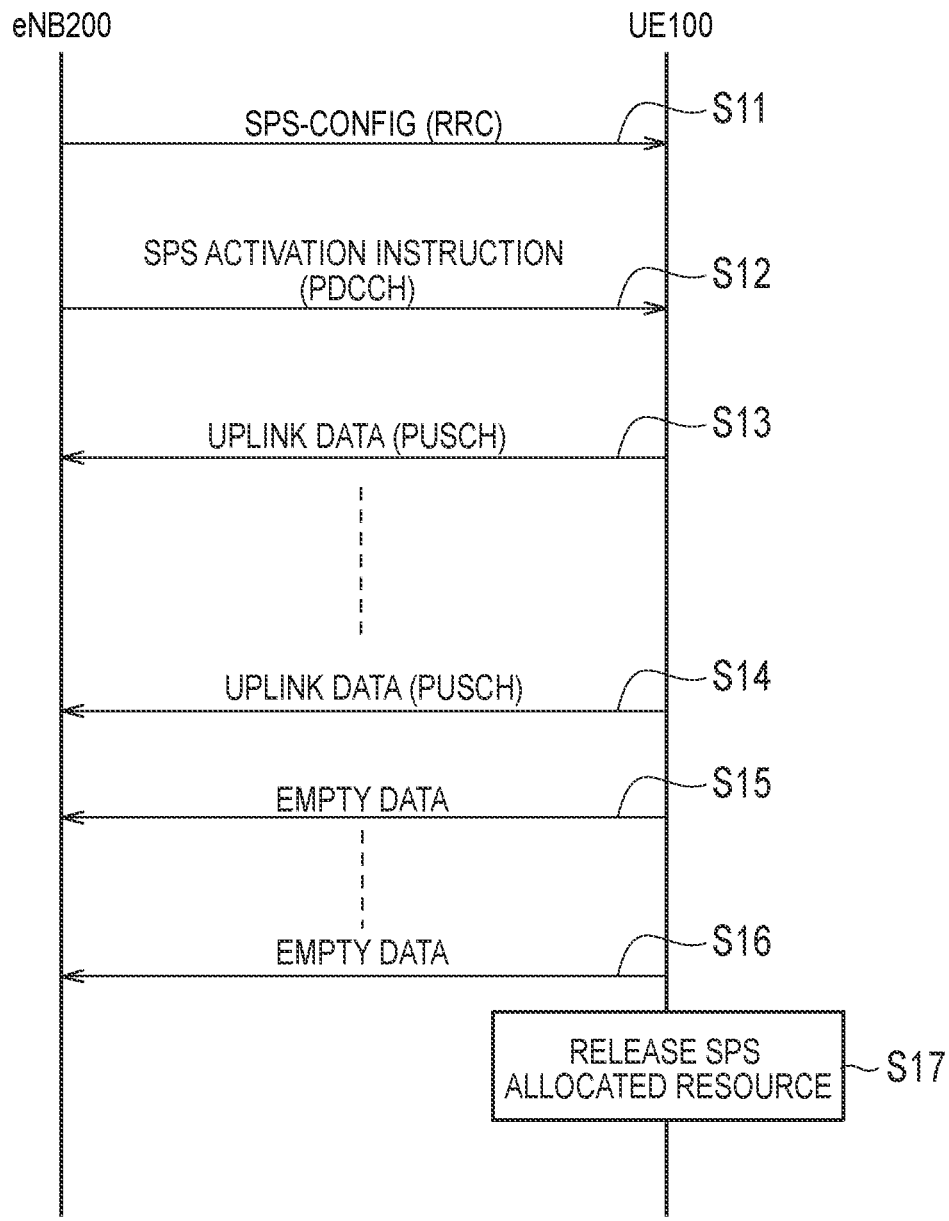

FIG. 9A

```
SPS-Config ::= SEQUENCE {
    semiPersistSchedC-RNTI      C-RNTI              OPTIONAL,       -- Need OR
    sps-ConfigDL                SPS-ConfigDL        OPTIONAL,       -- Need ON
    sps-ConfigUL                SPS-ConfigUL        OPTIONAL        -- Need ON
}
```

FIG. 9B

```
SPS-ConfigUL ::=  CHOICE {
    release                     NULL,
    setup                       SEQUENCE {
        semiPersistSchedIntervalUL      ENUMERATED {
                                        sf10, sf20, sf32, sf40, sf64, sf80,
                                        sf128, sf160, sf320, sf640, spare6,
                                        spare5, spare4, spare3, spare2,
                                        spare1},
        implicitReleaseAfter            ENUMERATED {e2, e3, e4, e8},
        p0-Persistent                   SEQUENCE {
            p0-NominalPUSCH-Persistent      INTEGER (-126..24),
            p0-UE-PUSCH-Persistent          INTEGER (-8..7)
        }   OPTIONAL,                                           -- Need OP
        twoIntervalsConfig              ENUMERATED {true}       OPTIONAL, -- Cond TDD
        ...,
        [[ p0-PersistentSubframeSet2-r12    CHOICE {
            release                         NULL,
            setup                           SEQUENCE {
                p0-NominalPUSCH-PersistentSubframeSet2-r12      INTEGER (-
126..24),
                p0-UE-PUSCH-PersistentSubframeSet2-r12          INTEGER (-8..7)
            }
        }                                   OPTIONAL -- Need ON
        ]]
    }
}
```

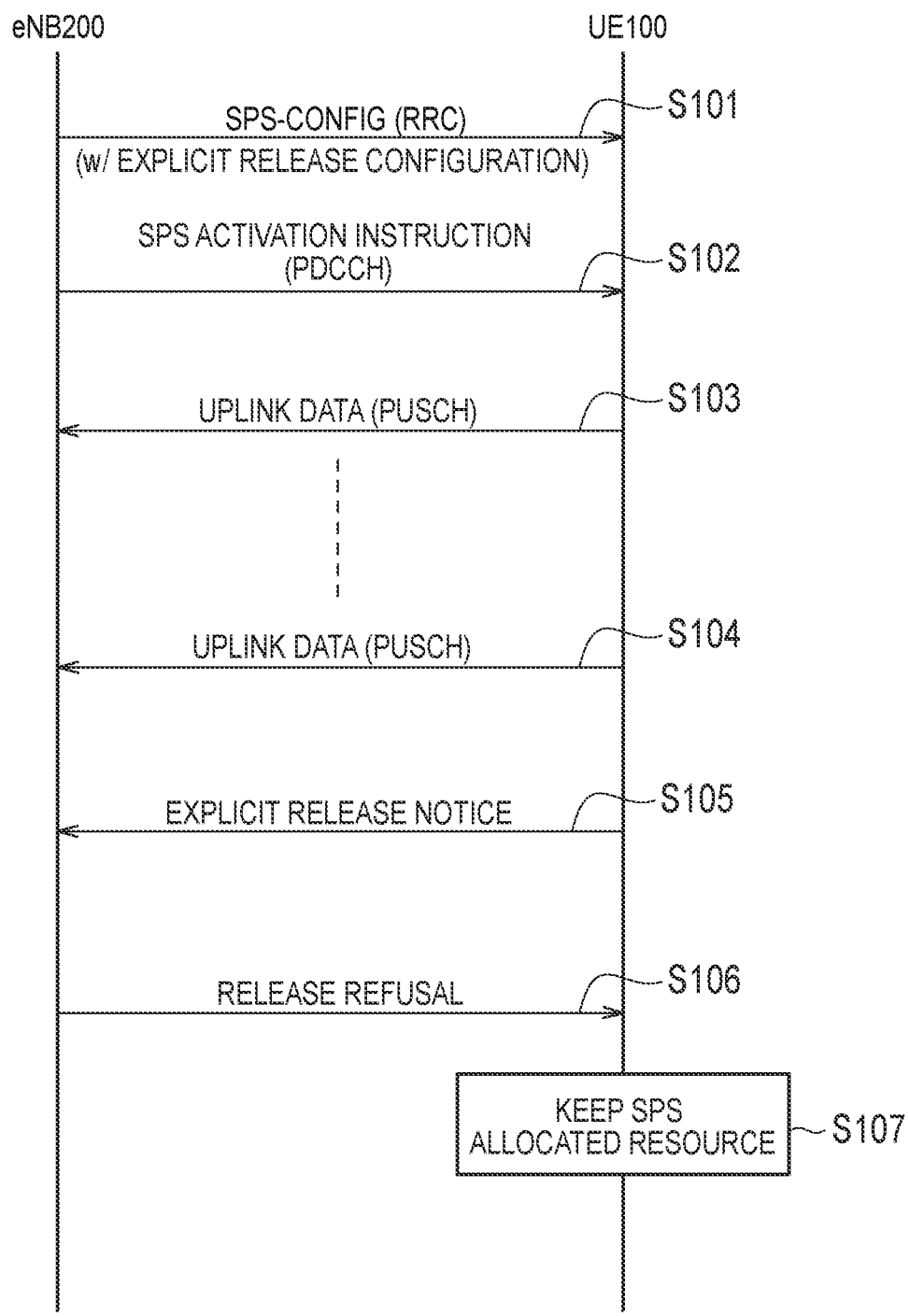

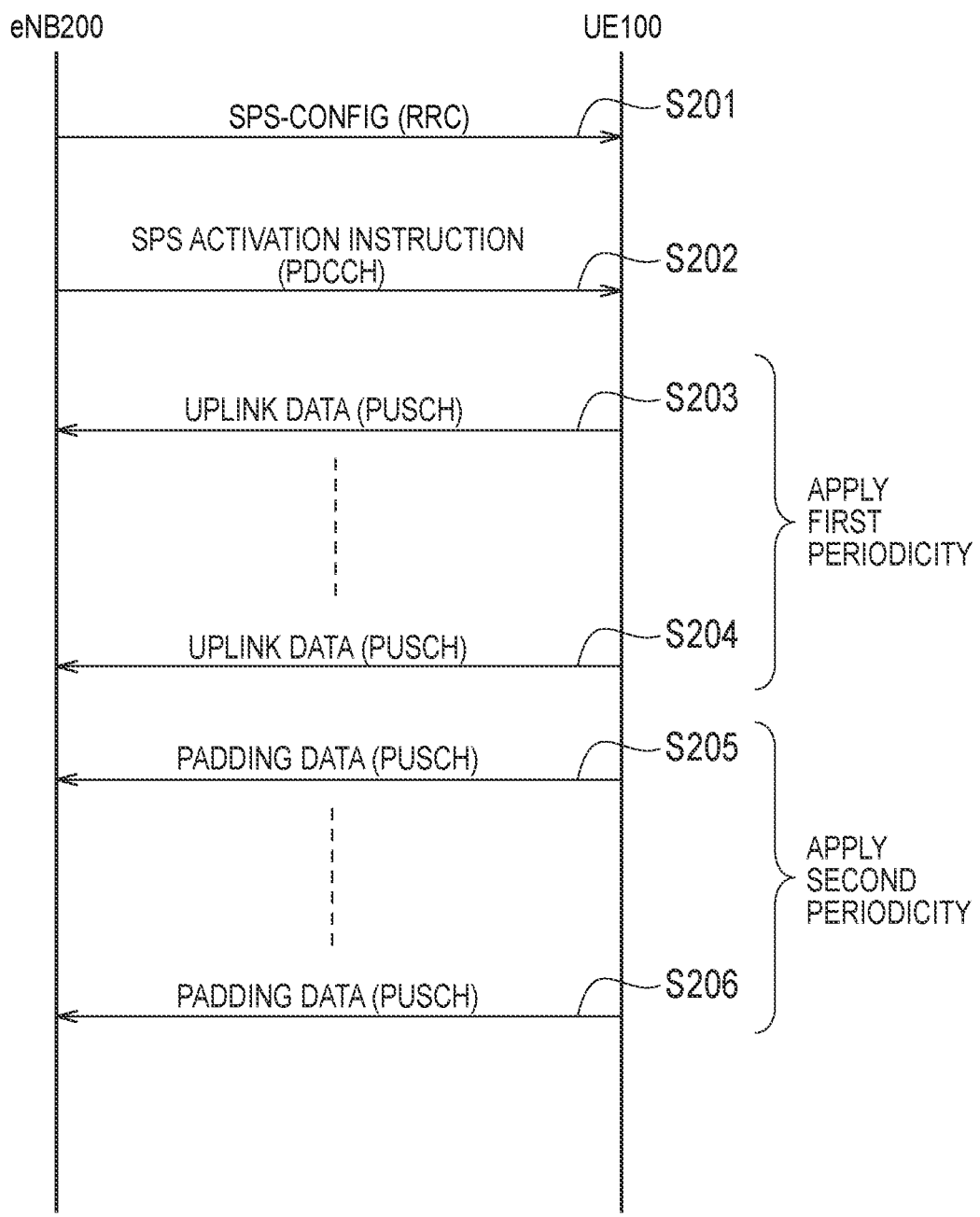

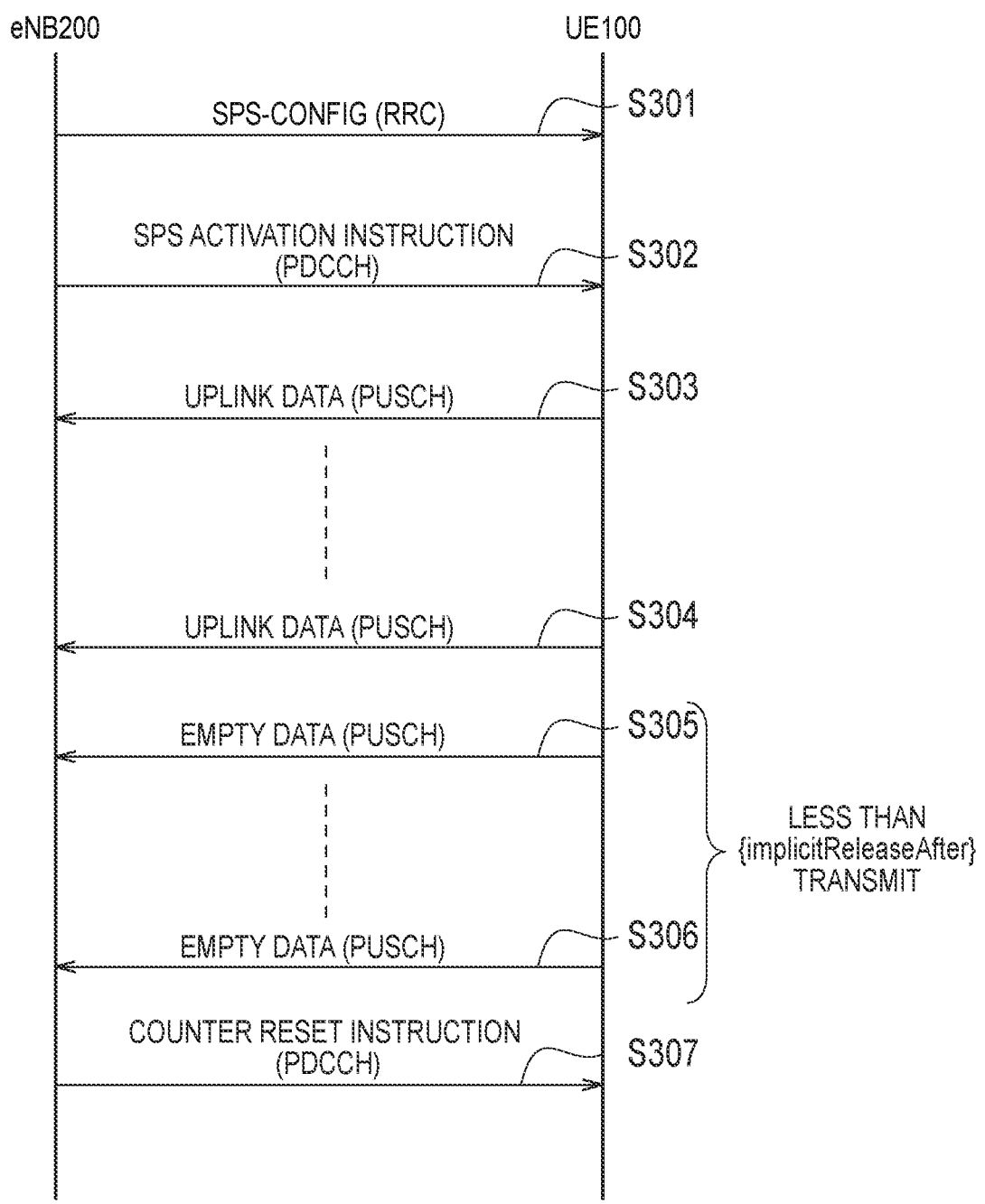

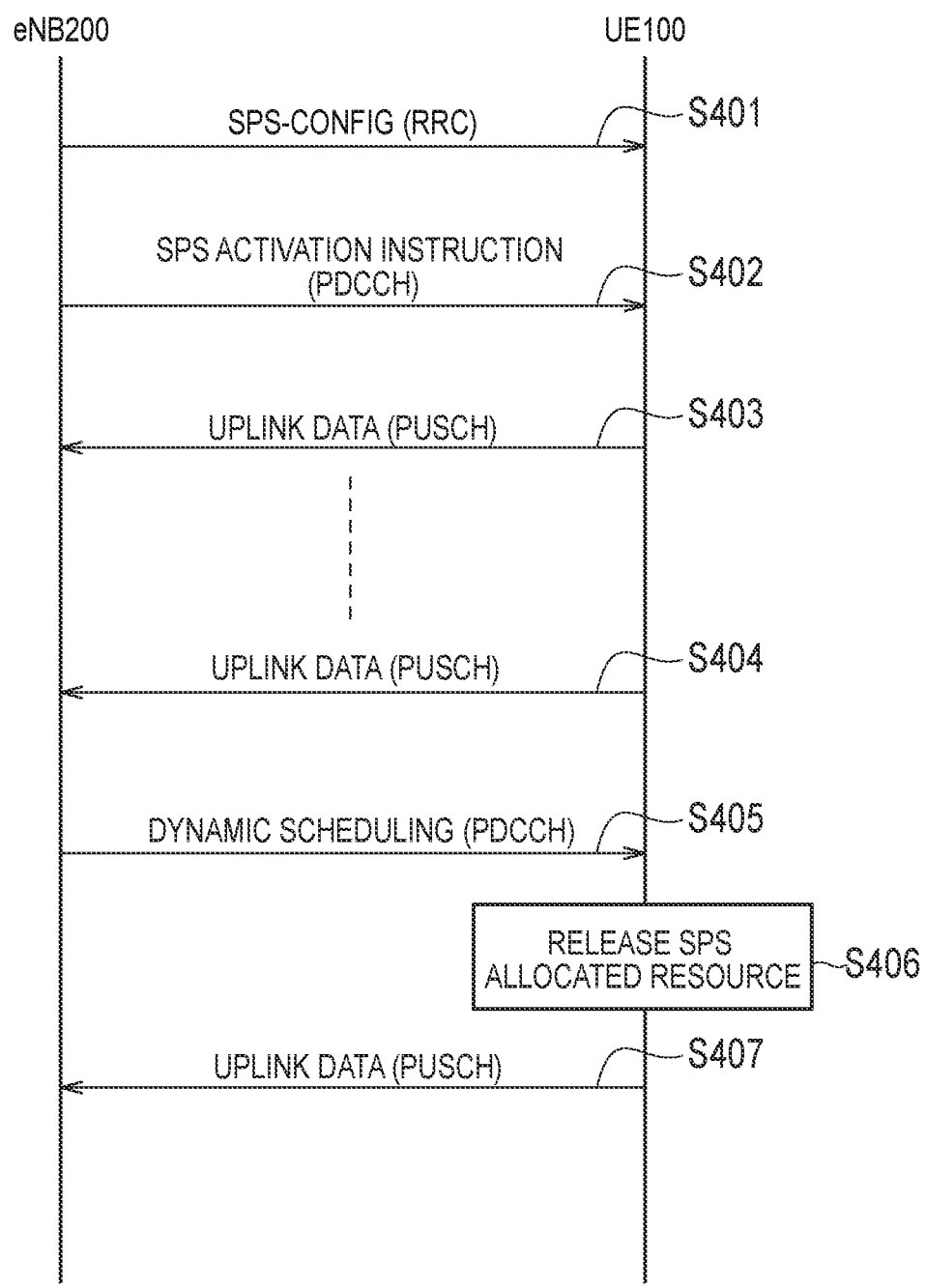

FIG. 15
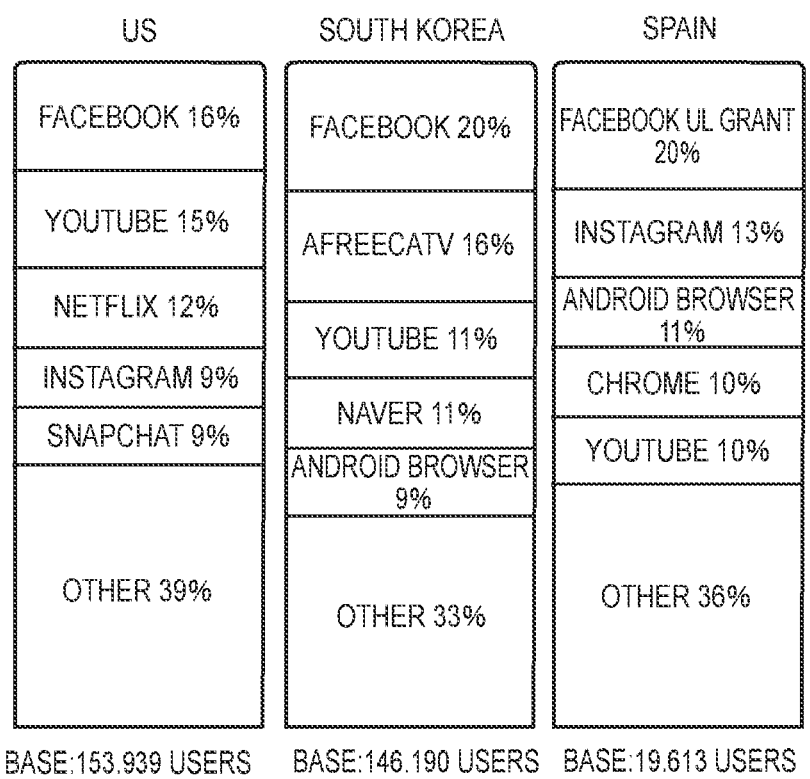
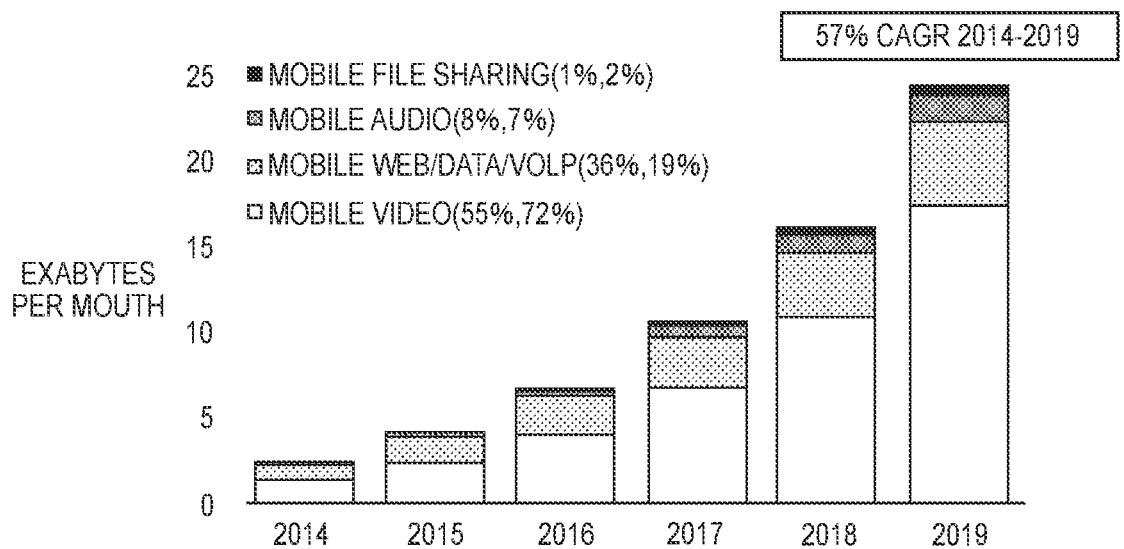

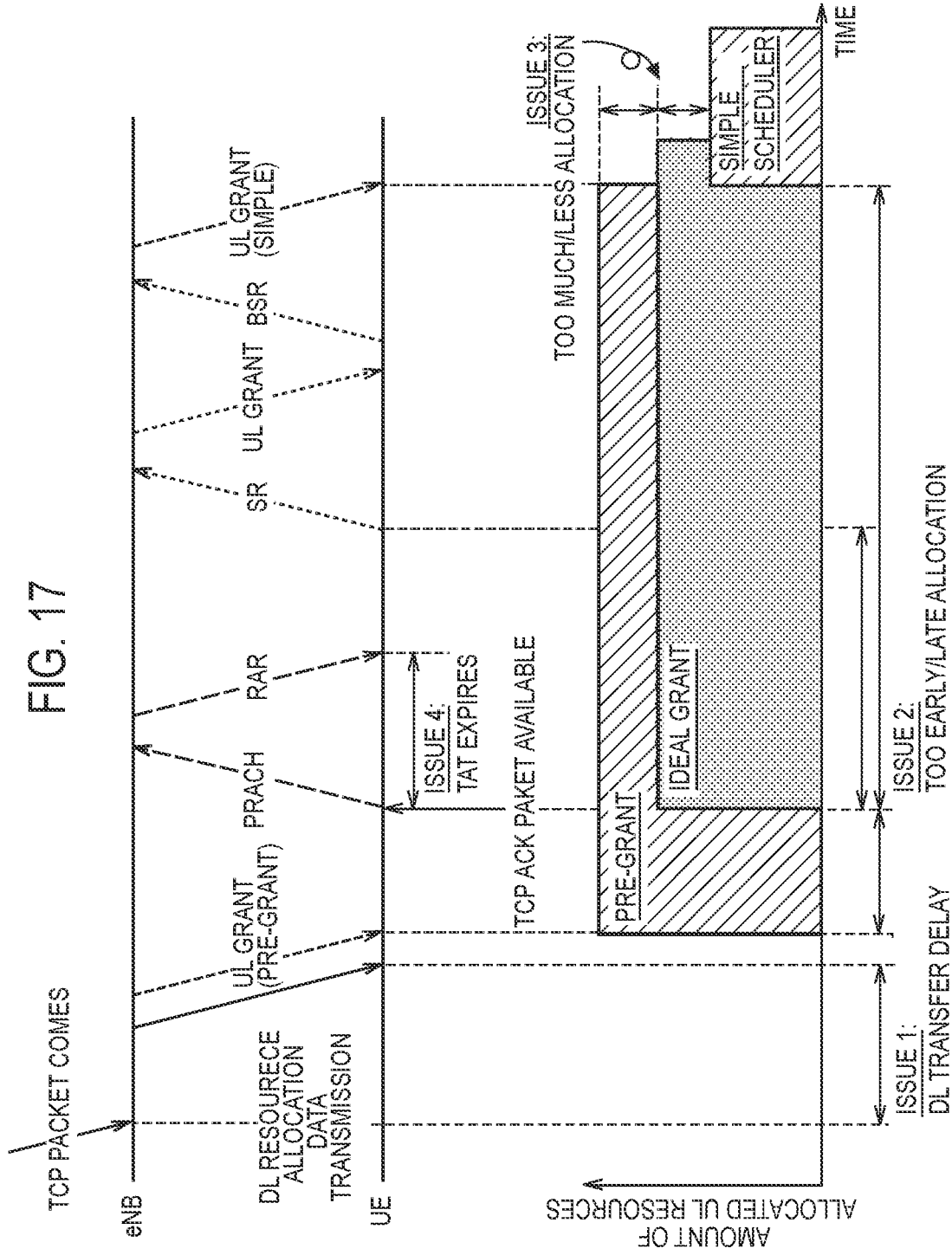

… (1) …

RADIO TERMINAL

RELATED APPLICATION

This application is a continuation application of international application PCT/JP2016/063713, filed May 9, 2016, which claims the benefit of U.S. Provisional Application No. 62/162,166 (filed May 15, 2015) and U.S. Provisional Application No. 62/165,315 (filed May 22, 2015), the entire contents of which are incorporated herein by reference.

TECHNICAL FIELD

The present disclosure relates to a radio terminal used in a mobile communication system.

BACKGROUND ART

In the Third Generation Partnership Project (3GPP), which is a mobile communication system standardization project, the introduction of a latency reducing function of reducing latency in radio communication is considered. As techniques for realizing such a latency reducing function, there are a fast uplink access technique, Transmission Time Interval (TTI) shortening technique, and the like.

SUMMARY

A radio terminal according to an embodiment is a terminal to which radio resources are allocated from a base station by Semi-Persistent Scheduling (SPS). The radio terminal includes a controller configured to perform processing of transmitting, to the base station, an explicit SPS release notice for releasing the radio resources allocated by the SPS.

A radio terminal according to an embodiment is a terminal for transmitting uplink data to a base station at a first periodicity using uplink radio resources allocated from the base station by Semi-Persistent Scheduling (SPS). The radio terminal includes a controller configured to, if the uplink data to be transmitted to the base station does not exist, perform processing of transmitting padding data to the base station at a second periodicity longer than the first periodicity, without transmitting the uplink data in part of transmission opportunities defined according to the first periodicity.

A radio terminal according to an embodiment is a terminal to which uplink radio resources are allocated from a base station by Semi-Persistent Scheduling (SPS). The radio terminal includes: a transmitter configured to consecutively transmit empty data to the base station for implicitly indicating release of the uplink radio resources; and a controller configured to manage a counter configured to count the number of times the empty data have been consecutively transmitted, and to release the uplink radio resources if a value of the counter reaches a threshold. The controller is configured to reset a value of the counter if particular downlink control information is received from the base station.

A radio terminal according to an embodiment is a terminal to which radio resources are allocated from a base station by Semi-Persistent Scheduling (SPS). The radio terminal includes a controller configured to release the radio resources allocated by the SPS, if radio resources for initial transmission is allocated from the base station by dynamic scheduling.

A radio terminal according to an embodiment is a terminal to which uplink radio resources are allocated from a base station by Semi-Persistent Scheduling (SPS). The radio terminal includes a controller configured to, if special SPS in which nonperformance of uplink transmission in a transmission opportunity defined according to an SPS periodicity is permitted is configured by the base station, and uplink transmission is not performed in the transmission opportunity, omit monitoring of HARQ ACK/NACK corresponding to the uplink transmission.

BRIEF DESCRIPTION OF DRAWINGS

FIG. 6 is a diagram for illustrating an overview of a Transmission Control Protocol (TCP).

FIG. 7 is a diagram for illustrating a transmission procedure of uplink.

FIG. 8 is a diagram illustrating a sequence example of SPS in uplink.

FIGS. 9A and 9B are diagrams for illustrating "SPS Config".

FIG. 10 is a diagram illustrating a sequence example according to a first embodiment.

FIG. 11 is a diagram illustrating a sequence example according to a second embodiment.

FIG. 12 is a diagram illustrating a sequence example according to a third embodiment.

FIG. 13 is a diagram illustrating a sequence example according to a fourth embodiment.

FIG. 15 is a diagram according to an additional statement of an embodiment.

FIG. 17 is a diagram according to the additional statement of the embodiment.

DESCRIPTION OF EMBODIMENTS

Overview of Embodiment

Figure 1:
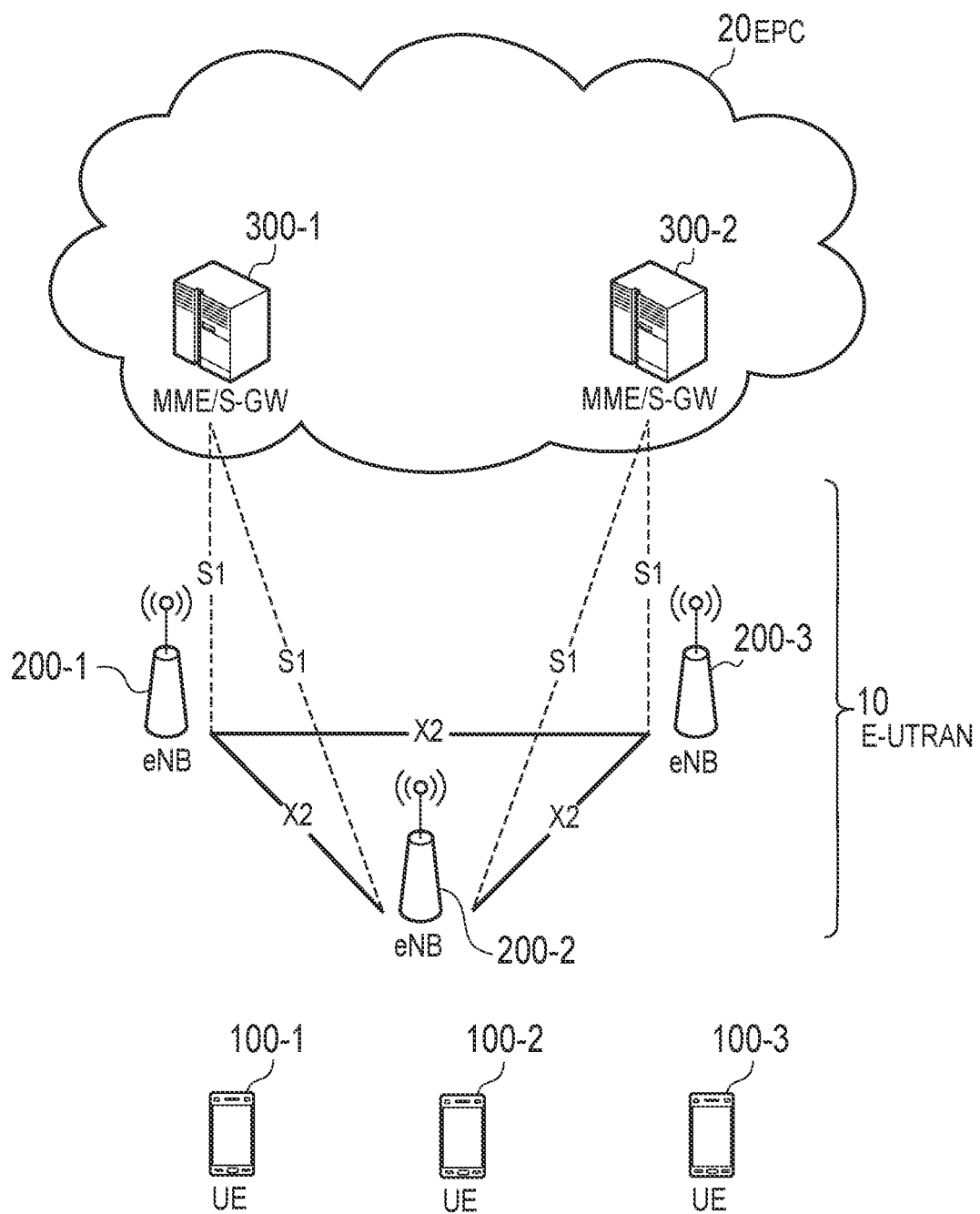
FIG. 1 is a diagram illustrating a Long Term Evolution (LTE) system (mobile communication system) according to an embodiment.

A general transmission procedure of uplink includes the following first to third steps.

In the first step, a radio terminal transmits, to a base station, a scheduling request (SR) for requesting a Physical Uplink Shared Channel (PUSCH) resource, using a Physical Uplink Control Channel (PUCCH) resource. In response to the reception of the SR, the base station allocates the PUSCH resource to the radio terminal.

In the second step, using the PUSCH resource allocated from the base station, the radio terminal transmits, to the base station, a buffer status report (BSR) including buffer information indicating an amount of uplink data in a transmission buffer of the radio terminal. In response to the reception of the BSR, the base station allocates an appropriate amount of the PUSCH resource to the radio terminal.

In the third step, using the PUSCH resource allocated from the base station, the radio terminal transmits uplink data in the transmission buffer of the radio terminal, to the base station.

Such a transmission procedure of uplink has such a problem that a time from when the radio terminal generates uplink data to when the transmission of the uplink data is completed (i.e., latency of uplink) is long.

As a method of fast uplink access that reduces latency of uplink, there is a method that uses Semi-Persistent Scheduling (SPS). According to the SPS, because a base station can allocate periodical radio resources (e.g., PUSCH resources) to a radio terminal in advance, the latency of uplink can be reduced.

Nevertheless, the method of fast uplink access that uses SPS has room for improvement in that release or keeping of the radio resources allocated by SPS can be smoothed.

In the following embodiments, there is disclosed a method that can smooth the release or keeping of the radio resources allocated by SPS.

A radio terminal according to a first embodiment is a terminal to which radio resources are allocated from a base station by Semi-Persistent Scheduling (SPS). The radio terminal includes a controller configured to perform processing of transmitting, to the base station, an explicit SPS release notice for releasing the radio resources allocated by the SPS.

A radio terminal according to a second embodiment is a terminal for transmitting uplink data to a base station at a first periodicity using uplink radio resources allocated from the base station by Semi-Persistent Scheduling (SPS). The radio terminal includes a controller configured to, if the uplink data to be transmitted to the base station does not exist, perform processing of transmitting padding data to the base station at a second periodicity longer than the first periodicity, without transmitting the uplink data in part of transmission opportunities defined according to the first periodicity.

A radio terminal according to a third embodiment is a terminal to which uplink radio resources are allocated from a base station by Semi-Persistent Scheduling (SPS). The radio terminal includes: a transmitter configured to consecutively transmit empty data to the base station for implicitly indicating release of the uplink radio resources; and a controller configured to manage a counter configured to count the number of times the empty data have been consecutively transmitted, and to release the uplink radio resources if a value of the counter reaches a threshold. The controller is configured to reset a value of the counter if particular downlink control information is received from the base station.

A radio terminal according to a fourth embodiment is a terminal to which radio resources are allocated from a base station by Semi-Persistent Scheduling (SPS). The radio terminal includes a controller configured to release the radio resources allocated by the SPS, if radio resources for initial transmission is allocated from the base station by dynamic scheduling.

A radio terminal according to a fifth embodiment is a terminal to which uplink radio resources are allocated from a base station by Semi-Persistent Scheduling (SPS). The radio terminal includes a controller configured to, if special SPS in which nonperformance of uplink transmission in a transmission opportunity defined according to an SPS periodicity is permitted is configured by the base station, and uplink transmission is not performed in the transmission opportunity, omit monitoring of HARQ ACK/NACK corresponding to the uplink transmission.

[Mobile Communication System]

An overview of a Long Term Evolution (LTE) system being a mobile communication system according to an embodiment will be described below.

(Configuration of Mobile Communication System)

FIG. 1 is a diagram illustrating a configuration of the LTE system. As illustrated in FIG. 1, the LTE system includes a User Equipment (UE) 100, an Evolved-UMTS Terrestrial Radio Access Network (E-UTRAN) 10, and an Evolved Packet Core (EPC) 20.

The UE 100 corresponds to a radio terminal. The UE 100 is a mobile communication apparatus, and performs radio communication with a cell (serving cell).

The E-UTRAN 10 corresponds to a radio access network. The E-UTRAN 10 includes an evolved Node-B (eNB) 200. The eNB 200 corresponds to a base station. The eNBs 200 are connected to each other via an X2 interface.

The eNB 200 manages one or a plurality of cells, and performs radio communication with the UE 100 that has established connection with the own cells. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area, and furthermore, also used as a term indicating a function of performing radio communication with the UE 100.

The EPC 20 corresponds to a core network. The EPC 20 includes a Mobility Management Entity (MME)/Serving-Gateway (S-GW) 300. The MME performs various types of mobility control for the UE 100, and the like. The S-GW performs transfer control of data. The MME/S-GW 300 is connected with the eNB 200 via an S1 interface. The E-UTRAN 10 and the EPC 20 form a network.

(Configuration of Radio Terminal)

Figure 2:
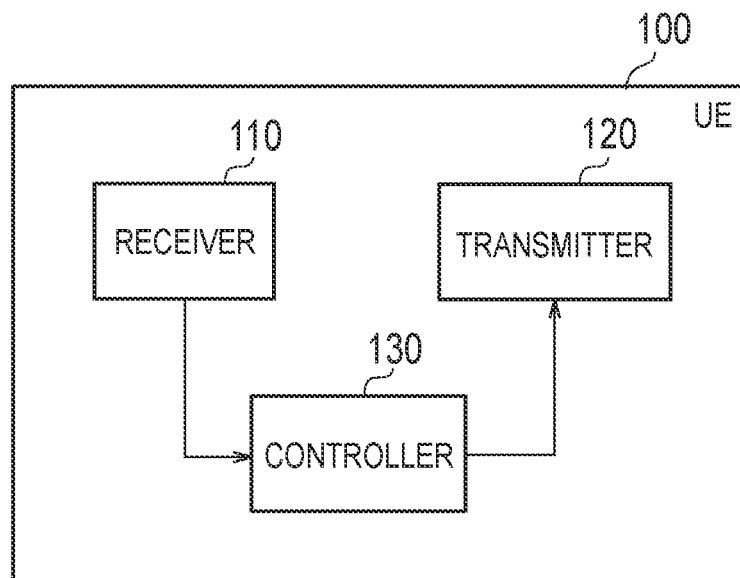
FIG. 2 is a block diagram of a user equipment (UE)(radio terminal) according to the embodiment.

FIG. 2 is a block diagram of the UE 100 (radio terminal). As illustrated in FIG. 2, the UE 100 includes a receiver 110, a transmitter 120, and a controller 130.

The receiver 110 performs various types of reception under the control of the controller 130. The receiver 110 includes an antenna and a receiving device. The receiving device converts a radio signal received by the antenna, into a baseband signal (reception signal), and outputs the baseband signal to the controller 130.

The transmitter 120 performs various types of transmission under the control of the controller 130. The transmitter 120 includes an antenna and a transmission device. The transmission device converts a baseband signal (transmission signal) output by the controller 130, into a radio signal, and transmits the radio signal from the antenna.

The controller 130 performs various types of control in the UE 100. The controller 130 includes a processor and a memory. The memory stores a program to be executed by the processor, and information to be used in processing performed by the processor. The processor includes a baseband processor that performs modulation/demodulation and encoding/decoding of a baseband signal, and the like, and a central processing unit (CPU) that executes programs stored in the memory, to perform various types of processing. The processor may include a codec that performs encoding/decoding of an audio/video signal. The processor executes the aforementioned processing and processing to be described later.

(Configuration of Base Station)

Figure 3:
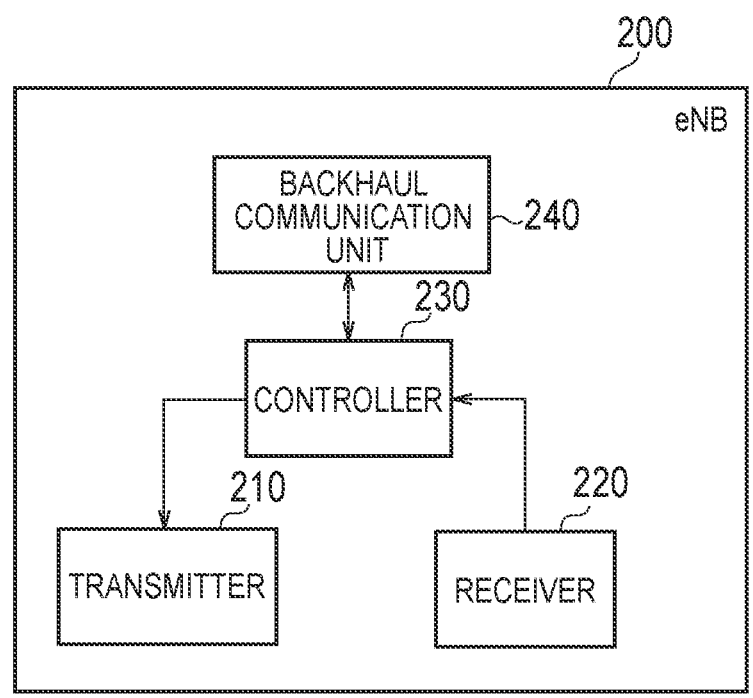
FIG. 3 is a block diagram of an evolved Node-B (eNB) (base station) according to the embodiment.

FIG. 3 is a block diagram of the eNB 200 (base station). As illustrated in FIG. 3, the eNB 200 includes a transmitter 210, a receiver 220, a controller 230, and a backhaul communication unit 240.

The transmitter 210 performs various types of transmission under the control of the controller 230. The transmitter 210 includes an antenna and a transmission device. The transmission device converts a baseband signal (transmission signal) output by the controller 230, into a radio signal, and transmits the radio signal from the antenna.

The receiver 220 performs various types of reception under the control of the controller 230. The receiver 220 includes an antenna and a receiving device. The receiving device converts a radio signal received by the antenna, into a baseband signal (reception signal), and outputs the baseband signal to the controller 230.

The controller 230 performs various types of control in the eNB 200. The controller 230 includes a processor and a memory. The memory stores a program to be executed by the processor, and information to be used in processing performed by the processor. The processor includes a baseband processor that performs modulation/demodulation and encoding/decoding of a baseband signal, and the like, and a central processing unit (CPU) that executes programs stored in the memory, to perform various types of processing. The processor executes the aforementioned processing and processing to be described later.

The backhaul communication unit 240 is connected with an adjacent eNB 200 via the X2 interface, and connected with the MME/S-GW 300 via the S1 interface. The backhaul communication unit 240 is used for communication performed on the X2 interface, communication performed on the S1 interface, and the like.

(Configuration of Radio Interface)

Figure 4:
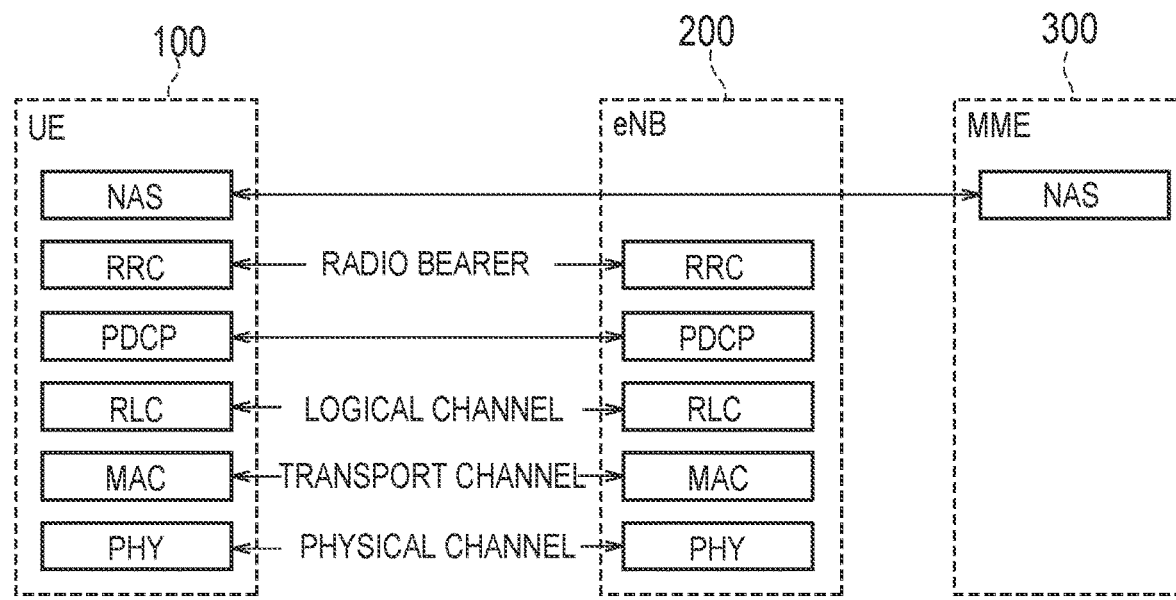
FIG. 4 is a protocol stack diagram of a radio interface in the LTE system.

FIG. 4 is a protocol stack diagram of a radio interface in the LTE system. As illustrated in FIG. 4, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control information are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control information are transferred via a transport channel. The MAC layer of the eNB 200 includes a scheduler for deciding a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control information. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected mode. If not, the UE 100 is in an RRC idle mode.

A non-access stratum (NAS) layer located above the RRC layer performs session management, mobility management, and the like.

The UE 100 includes the fourth to seventh layers of the OSI reference model as higher protocols of the radio interface protocol. A transport layer being the fourth layer includes a Transmission Control Protocol (TCP). The TCP will be described later.

(Overview of LTE Lower Layer)

Figure 5:
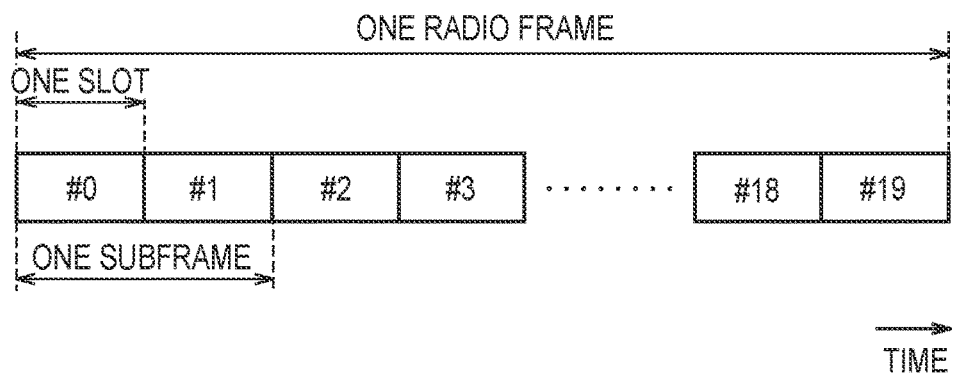
FIG. 5 is a configuration diagram of a radio frame used in the LTE system.

FIG. 5 is a configuration diagram of a radio frame used in the LTE system. In the LTE system, Orthogonal Frequency Division Multiple Access (OFDMA) and Single Carrier Frequency Division Multiple Access (SC-FDMA) are applied to downlink and uplink, respectively.

As illustrated in FIG. 5, the radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction, and a plurality of symbols in the time direction. Each resource block includes a plurality of subcarriers in the frequency direction. One resource element (RE) is constituted by one symbol and one subcarrier. In addition, among radio resources (time/frequency resources) to be allocated to the UE 100, a frequency resource can be identified by resource blocks and a time resource can be identified by subframes (or slots).

In downlink, a section corresponding to beginning several symbols of each subframe is a region used as a physical downlink control channel (PDCCH) for transferring mainly downlink control information, and a physical HARQ Indicator channel (PHICH) for transferring HARQ ACK/NACK. In addition, a remaining part of each subframe is a region that can be used as a physical downlink shared channel (PDSCH) for transferring mainly downlink data.

Basically, the eNB 200 transmits downlink control information (DCI) to the UE 100 using the PDCCH, and transmits downlink data to the UE 100 using the PDSCH. The downlink control information conveyed by the PDCCH includes uplink scheduling information, downlink scheduling information, and a TPC command. The uplink scheduling information is scheduling information (UL grant) related to the allocation of an uplink radio resource, and the downlink scheduling information is scheduling information related to the allocation of a downlink radio resource. The TPC command is information instructing the increase and decrease of transmission power of the uplink. For identifying a UE 100 which is a transmission destination of downlink control information, the eNB 200 includes a CRC bit scrambled using an identifier (Radio Network Temporary ID (RNTI)) of the transmission destination UE 100, in the downlink control information. For downlink control information that has a possibility of being addressed to an own UE, each UE 100 descrambles the CRC bit using the RNTI of the own UE, and thereby blind decodes the PDCCH, to detect downlink control information addressed to the own UE. The PDSCH conveys downlink data using a downlink radio resource (resource block) indicated by the downlink scheduling information.

In uplink, both end portions in the frequency direction of each subframe are regions used as a physical uplink control channel (PUCCH) for transferring mainly uplink control information. A remaining part of each subframe is a region that can be used as a physical uplink shared channel (PUSCH) for transferring mainly uplink data.

Basically, the UE 100 transmits uplink control information (UCI) to the eNB 200 using the PUCCH, and transmits uplink data to the eNB 200 using the PUSCH. The uplink control information carried by the PUCCH includes a Channel Quality Indicator (CQI), a Precoding Matrix Indicator (PMI), a Rank Indicator (RI), a Scheduling Request (SR), and the HARQ ACK/NACK. The CQI is an index indicating channel quality of the downlink, and is used for deciding an MCS to be used in downlink transfer, and the like. The PMI is an index indicating a precoder matrix desirably used for transferring the downlink. The RI is an index indicating the number of layers (the number of streams) that can be used for transferring the downlink. The SR is information requesting the allocation of the PUSCH resource. The HARQ ACK/NACK is delivery confirmation information indicating whether downlink data has been correctly received.

(Overview of TCP)

FIG. 6 is a diagram for illustrating an overview of the TCP. In the embodiment, the UE 100 performs TCP communication with a server on the Internet via a network of the LTE system.

As illustrated in FIG. 6, the server determines a congestion status of the network based on "TCP ACK" from the UE 100. The server gradually increases a window size in response to the reception of "TCP ACK". The window size is an amount of "TCP Segment" consecutively transmitted without waiting for "TCP ACK". On the other hand, the server halves the window size if the reception of "TCP ACK" has failed (timed out). Such control is referred to as "slow start".

Thus, even if the downlink of the LTE system is not congested, TCP throughput of downlink cannot be enhanced unless the UE 100 immediately transmits "TCP ACK" in uplink. In other words, if a delay time (latency of uplink) from when "TCP ACK" is generated in the UE 100 to when the transmission of "TCP ACK" to the eNB 200 is completed can be shortened, TCP throughput of downlink can be enhanced.

(Transmission Procedure of Uplink)

FIG. 7 is a diagram for illustrating a transmission procedure of uplink. In FIG. 7, the UE 100 is in a state in which RRC connection with the eNB 200 has been established (i.e., RRC connected mode).

As illustrated in FIG. 7, in step S1, the eNB 200 receives a TCP packet (TCP segment) from the EPC 20.

In step S2, the eNB 200 allocates a PDSCH resource to the UE 100 using a PDCCH resource. In addition, the eNB 200 transmits, to the UE 100, downlink data corresponding to the TCP packet received from the EPC 20, using the PDSCH resource. More specifically, the eNB 200 transmits, to the UE 100, DCI including downlink scheduling information, on the PDCCH, and transmits downlink data to the UE 100 using the PDSCH resource indicated by the DCI.

At this stage, the eNB 200 may allocate a periodical PUSCH resource to the UE 100 in advance by SPS (step S2A). Such a method will be sometimes referred to as "Pre-grant". The SPS will be described later. In addition, the following steps S3 to S6 are operations performed if "Pre-grant" is not performed.

The UE 100 receives the downlink data, and moves the downlink data to a higher layer of the UE 100. The higher layer of the UE 100 generates TCP ACK, and notifies a lower layer of the UE 100 of the TCP ACK. According to the existence of uplink data (TCP ACK packet) in a transmission buffer (lower layer of the UE 100), the UE 100 decides an allocation request of the PUSCH resource to the eNB 200.

In step S3, the UE 100 transmits, to the eNB 200, an SR for requesting the allocation of the PUSCH resource, using a PUCCH resource.

In step S4, in response to the reception of the SR, the eNB 200 allocates the PUSCH resource to the UE 100.

In step S5, using the PUSCH resource allocated from the eNB 200, the UE 100 transmits, to the eNB 200, a BSR including buffer information indicating an amount of uplink data in the transmission buffer of the UE 100.

In step S6, in response to the reception of the BSR, the eNB 200 allocates an appropriate amount of the PUSCH resource to the UE 100. Using the PUSCH resource allocated from the eNB 200, the UE 100 transmits, to the eNB 200, uplink data (TCP ACK packet) in the transmission buffer of the UE 100.

(Overview of SPS)

As mentioned above, according to the SPS, because the eNB 200 can allocate a periodical radio resource (PUSCH resource) to the UE 100 in advance, the latency of uplink can be reduced.

In addition, in SPS, one piece of scheduling information is allocated not only to one subframe, but also to a number of subsequent subframes. In other words, by periodically allocating a radio resource or the like that is indicated by the scheduling information, overhead incidental to the transfer of scheduling information is reduced.

The overview of SPS in uplink will be described below. FIG. 8 is a diagram illustrating a sequence example of SPS in uplink. FIGS. 9A and 9B are diagrams for illustrating "SPS Config".

As illustrated in FIG. 8, in step S11, the eNB 200 transmits configuration information of SPS (SPS Config) to the UE 100 using individual RRC signaling. The "SPS Config" includes various parameter related to SPS. The UE 100 receives and stores the "SPS Config".

As illustrated in FIG. 9A, "SPS Config" includes semi-PersistSchedC-RNTI (SPS C-RNTI), sps-ConfigDL, and sps-ConfigUL. The "SPS C-RNTI" is a temporary identifier of the UE 100 for SPS. The sps-ConfigDL includes an SPS parameter in downlink, and the sps-ConfigUL includes an SPS parameter in uplink.

As illustrated in FIG. 9B, the sps-ConfigUL includes "release" for releasing the SPS parameter in uplink, or "setup" for setting up the SPS parameter in uplink. In the case of "setup", the sps-ConfigUL includes, as a major parameter, an SPS periodicity in uplink (semiPersistSchedIntervalUL). The semiPersistSchedIntervalUL is designated on a subframe basis such as, for example, ten-subframe periodicity (sf10) or 20-subframe periodicity (sf20). The sps-ConfigUL can include a parameter (implicitReleaseAfter) for implicitly releasing a radio resource (SPS allocated resource) allocated by SPS. The implicitReleaseAfter indicates the number of empty data transmissions (empty transmissions) required for releasing the SPS resource. The empty data is, for example, "MAC PDU" not including "MAC SDU". In other words, if the implicitReleaseAfter is configured, the UE 100 releases the SPS allocated resource by transmitting empty data the number of times indicated by the implicitReleaseAfter, using the SPS allocated resource. As the implicitReleaseAfter, any of twice (e2), three times (e3), four times (e4), and eight times (e8) is configured.

Referring back to FIG. 8, in step S12, the eNB 200 transmits, to the UE 100, DCI (SPS activation instruction) for activating SPS, using the PDCCH. The SPS activation instruction is masked using the "SPS C-RNTI". In addition, the SPS activation instruction includes scheduling information (UL grant) such as a resource block (PUSCH resource) to be allocated to the UE 100, and MCS.

If the UE 100 decodes the SPS activation instruction by blind decoding, the UE 100 stores the scheduling information included in the SPS activation instruction.

In step S13, the UE 100 performs initial transmission by SPS. More specifically, the UE 100 transmits uplink data to the eNB 200 using the PUSCH according to the scheduling information included in the SPS activation instruction. After that, the UE 100 transmits uplink data to the eNB 200 using the PUSCH according to the scheduling information, at each SPS periodicity indicated by the semiPersistSchedIntervalUL (step S14).

Here, it is assumed that uplink data to be transmitted to the eNB 200 becomes nonexistent in the UE 100 (i.e., data becomes nonexistent in the uplink transmission buffer).

In steps S15 to S16, the UE 100 performs empty data transmission (empty transmission) the number of times corresponding to the implicitReleaseAfter, in transmission opportunities defined by semiPersistSchedIntervalUL.

In step S17, the UE 100 releases the SPS allocated resource.

In this manner, the UE 100 needs to always continue transmission in the transmission opportunity allocated by SPS, which is problematic from the viewpoint of power consumption of the UE 100. In addition, if uplink data to be transmitted to the eNB 200 does not exist, the UE 100 side implicitly releases SPS. Thus, the eNB needs to instruct the UE 100 to perform SPS activation, which is problematic. Thus, if SPS is used for reducing the latency of uplink, a structure for keeping SPS while suppressing the power consumption of the UE 100 is desired.

First Embodiment

A first embodiment will be described below.

A radio resource is allocated from the eNB 200 to the UE 100 according to the first embodiment, by SPS. The UE 100 includes the controller 130 that performs processing of transmitting, to the eNB 200, an explicit SPS release notice for releasing the radio resource allocated by SPS. Only if the UE 100 receives a transmission configuration of the explicit SPS release notice, the controller 130 performs the processing of transmitting the explicit SPS release notice to the eNB 200. If the UE 100 receives the transmission configuration, the controller 130 deactivates a function of implicitly releasing the SPS allocated resource (i.e., implicitReleaseAfter). If the eNB 200 indicates permission for the explicit SPS release notice, the controller 130 releases the radio resource allocated by SPS. In contrast to this, if the eNB 200 indicates refusal to the explicit SPS release notice, the controller 130 keeps the radio resource allocated by SPS. The eNB 200 can thereby perform control so that the UE 100 does not release SPS.

The eNB 200 according to the first embodiment allocates a radio resource to the UE 100 by SPS. The eNB 200 includes the controller 230 that performs processing of receiving, from the UE 100, the explicit SPS release notice for releasing the radio resource allocated by SPS. Only if the transmission configuration of the explicit SPS release notice is transmitted to the UE 100, the controller 230 performs the processing of receiving the explicit SPS release notice from the UE 100. If the transmission configuration is transmitted to the UE 100, the controller 230 deactivates the function of implicitly releasing the SPS allocated resource (i.e., implicitReleaseAfter). The controller 230 determines whether to permit the explicit SPS release notice, and notifies the UE 100 of the refusal to or permission for the explicit SPS release notice.

Next, a sequence of SPS in uplink according to the first embodiment will be described. FIG. 10 is a diagram illustrating a sequence example according to the first embodiment. Here, redundant description of operations overlapping those in FIG. 8 will be omitted.

As illustrated in FIG. 10, in step S101, the eNB 200 transmits configuration information of SPS (SPS Config) to the UE 100 using individual RRC signaling. The "SPS Config" includes various parameters illustrated in FIGS. 9A and 9B. The UE 100 receives and stores the "SPS Config". The eNB 200 may include configuration information of the explicit SPS release (explicit release) notice in "SPS Config". The configuration information is, for example, "explicitRelease ENNUMERATED (true)" to be added to "setup" in FIG. 9B. If "explicitrelease" is true (i.e., ON) according to the configuration information, the configuration of implicitReleaseAfter needs not be applied. Alternatively, the eNB 200 may include the configuration information of "explicit release" notice in the SPS activation instruction (step S102).

In step S102, the eNB 200 transmits, to the UE 100, DCI (SPS activation instruction) for activating SPS, using the PDCCH. The SPS activation instruction includes scheduling information (UL grant) such as a resource block (PUSCH resource) to be allocated to the UE 100, and MCS. The UE 100 stores the scheduling information included in the SPS activation instruction.

In steps S103 to S104, the UE 100 performs transmission by SPS. As mentioned above, the UE 100 transmits uplink data to the eNB 200 using the PUSCH according to the scheduling information, at each SPS periodicity indicated by the semiPersistSchedIntervalUL. Nevertheless, steps S103 to S104 are not essential, and may be omitted.

Here, a case in which uplink data to be transmitted to the eNB 200 does not exist in the UE 100 will be assumed.

In step S105, the UE 100 determines that the SPS allocated resource is unnecessary, and transmits, to the eNB 200, the "explicit release" notice for releasing the SPS allocated resource. The "explicit release" notice is transmitted from the UE 100 to the eNB 200 by MAC signaling (MAC control element), for example.

In step S106, the eNB 200 determines whether to permit the "explicit release" notice. The description will now be continued assuming that the eNB 200 determines to refuse the "explicit release" notice for keeping SPS for latency reduction of uplink (i.e., fast uplink access).

In step S106, the eNB 200 transmits, to the UE 100, a refusal notice indicating that the "explicit release" notice is refused. The refusal notice is transmitted from the eNB 200 to the UE 100 by MAC signaling (MAC control element), for example.

In step S107, in response to the reception of the refusal notice, the UE 100 determines that SPS needs to be kept, and keeps the stored scheduling information and keeps the SPS allocated resource.

In this manner, according to the first embodiment, the eNB 200 can perform control so that the UE 100 does not release SPS, by introducing the "explicit release" notice for releasing the SPS allocated resource, and the eNB 200 indicating permission for or refusal to the notice. The implementation of fast uplink access using SPS can be thereby smoothed.

Second Embodiment

A second embodiment will be described below mainly based on a difference from the first embodiment.

The UE 100 according to the second embodiment transmits uplink data to the eNB 200 at a first periodicity (semiPersistSchedIntervalUL) configured by RRC signaling, using an uplink radio resource allocated from the eNB 200 by SPS. The UE 100 includes the controller 130 that performs, if uplink data to be transmitted to the eNB 200 does not exist, processing of transmitting padding data to the eNB 200 at a second periodicity longer than the first periodicity, without transmitting uplink data in part of transmission opportunities defined according to the first periodicity. The second periodicity may be configured by MAC signaling or the PDCCH.

The eNB 200 according to the second embodiment receives the uplink data from the UE 100 at the first periodicity (semiPersistSchedIntervalUL) configured by RRC signaling, using the uplink radio resource allocated to the UE 100 by SPS. If the eNB 200 receives the padding data from the UE 100 at the second periodicity, the eNB 200 does not issue a retransmission request to the UE 100 even if uplink data is not received from the UE 100 in part of the transmission opportunities defined according to the first periodicity. For example, the eNB 200 detects that the UE 100 has not transmitted the PUSCH, according to the power detection of DMRS in the PUSCH. In other words, the eNB 200 side recognizes that the PUSCH has not been transmitted.

FIG. 11 is a diagram illustrating a sequence example according to the second embodiment. Here, redundant description of operations overlapping those in FIG. 8 will be omitted.

As illustrated in FIG. 11, in step S201, the eNB 200 transmits configuration information of SPS (SPS Config) to the UE 100 using individual RRC signaling. The "SPS Config" includes the first periodicity (semiPersistSchedIntervalUL). The UE 100 receives and stores the "SPS Config".

In step S202, the eNB 200 transmits, to the UE 100, DCI (SPS activation instruction) for activating SPS, using the PDCCH. The SPS activation instruction includes scheduling information (UL grant). The UE 100 stores the scheduling information included in the SPS activation instruction.

In addition, the eNB 200 configures the second periodicity in the UE 100 by MAC signaling or the PDCCH. The eNB 200 may include the second periodicity in the SPS activation instruction. In addition, if the second periodicity is configured, the UE 100 may overwrite the stored first periodicity (semiPersistSchedIntervalUL) with the second periodicity.

In steps S203 to S204, the UE 100 performs transmission by SPS. As mentioned above, the UE 100 transmits uplink data to the eNB 200 using the PUSCH according to the scheduling information, at each SPS periodicity (the first periodicity or the second periodicity). Nevertheless, steps S203 to S204 are not essential, and may be omitted.

Here, a case in which uplink data to be transmitted to the eNB 200 does not exist in the UE 100 will be assumed.

In steps S205 to S206, the UE 100 transmits the padding data to the eNB 200 at the second periodicity. Here, if the eNB 200 detects that the UE 100 has not transmitted the PUSCH, according to the power detection of DMRS in the PUSCH, the eNB 200 does not transmit a retransmission request (HARQ NACK) to the UE 100. In addition, in general SPS, it should be noted that, if the eNB 200 does not receive the uplink data from the UE 100 in a transmission opportunity defined according to an SPS periodicity (semiPersistSchedIntervalUL), the eNB 200 issues a retransmission request to the UE 100.

In this manner, according to the second embodiment, the UE 100 can avoid transmitting uplink data in all transmission opportunities defined according to an SPS periodicity (semiPersistSchedIntervalUL). Thus, power consumption of the UE 100 can be reduced while keeping SPS.

Third Embodiment

A third embodiment will be described below mainly based on a difference from the first and second embodiments.

An uplink radio resource is allocated from the eNB 200 to the UE 100 according to the third embodiment, by SPS. The UE 100 includes a transmitter 120 that consecutively transmits empty data to the eNB 200 for implicitly indicating the release of an uplink radio resource, and the controller 130 that manages a counter that counts the number of times empty data have been consecutively transmitted. If a value of the counter reaches a threshold (implicitReleaseAfter), the uplink radio resource is released. If the controller 130 receives particular downlink control information from the eNB 200, the controller 130 resets the value of the counter. The particular downlink control information is downlink control information not including scheduling information (i.e., empty DCI).

The eNB 200 according to the third embodiment allocates an uplink radio resource to the UE 100 by SPS. The eNB 200 includes a receiver 220 that consecutively receives, from the UE 100, empty data for implicitly indicating the release of an uplink radio resource, and a controller 230 that performs processing of transmitting, to the UE 100, particular downlink control information for resetting a value of a counter that counts the number of times empty data have been consecutively transmitted.

FIG. 12 is a diagram illustrating a sequence example according to the third embodiment. Here, redundant description of operations overlapping those in FIG. 8 will be omitted.

As illustrated in FIG. 12, in step S301, the eNB 200 transmits configuration information of SPS (SPS Config) to the UE 100 using individual RRC signaling. "SPS Config" includes implicitReleaseAfter. The UE 100 receives and stores the "SPS Config".

In step S302, the eNB 200 transmits, to the UE 100, DCI (SPS activation instruction) for activating SPS, using the PDCCH. The SPS activation instruction includes scheduling information (UL grant). The UE 100 stores the scheduling information included in the SPS activation instruction.

In steps S303 to S304, the UE 100 performs transmission by SPS. As mentioned above, the UE 100 transmits uplink data to the eNB 200 using the PUSCH according to the scheduling information, at each SPS periodicity (semiPersistSchedIntervalUL). Nevertheless, steps S303 to S304 are not essential, and may be omitted.

Here, a case in which uplink data to be transmitted to the eNB 200 does not exist in the UE 100 will be assumed.

In step S305, the UE 100 determines that the SPS allocated resource is unnecessary, and consecutively transmits empty data to the eNB 200 for implicitly indicating the release of the uplink radio resource. On the other hand, the eNB 200 determines that the SPS allocated resource is necessary.

In step S307, the eNB 200 transmits, to the UE 100, empty DCI (counter reset instruction) for resetting a count value in the UE 100, using the PDCCH, before the number of times empty data have been transmitted by the UE 100 (count value) reaches implicitReleaseAfter. The UE 100 resets the number of transmissions of empty data (count value) to zero in response to the reception of the counter reset instruction. The release of the SPS allocated resource that is performed by the UE 100 can be thereby avoided.

In this manner, according to the third embodiment, whether to releases the SPS allocated resource can be controlled by the eNB 200.

Fourth Embodiment

A fourth embodiment will be described below mainly based on a difference from the first to third embodiments.

A radio resource is allocated from the eNB 200 to the UE 100 according to the fourth embodiment, by SPS. The UE 100 includes a controller 130 that releases, if a radio resource for initial transmission is allocated from the eNB 200 by dynamic scheduling, the radio resource (the SPS allocated resource) allocated by SPS.

The eNB 200 according to the fourth embodiment allocates a radio resource to the UE 100 by SPS. The eNB 200 includes a controller 230 that determines, if a radio resource for initial transmission is allocated to the UE 100 by dynamic scheduling, that the SPS allocated resource has been released in the UE 100.

In addition, if dynamic allocation occurs in a subframe allocated by SPS (hereinafter, referred to as "a first case"), the dynamic allocation normally takes precedence. In other words, the UE 100 follows the dynamic allocation in the subframe. Nevertheless, neither an RRC configuration of SPS nor scheduling information (RB/MCS) is released. In addition, also if dynamic allocation that uses an HARQ process used in SPS occurs in a subframe other than the subframe allocated by SPS (hereinafter, referred to as "a second case"), an operation of normal dynamic allocation is performed for initial transmission and retransmission. In the second case, an operation of releasing a radio resource of SPS (the SPS allocated resource) by initial transmission allocation can be added without problem. In contrast, in the first case, the release of the SPS allocated resource may be avoided because there is such a reason that allocation is temporarily changed for the sake of the eNB 200 (for the sake of resource allocation of another UE, etc.).

FIG. 13 is a diagram illustrating a sequence example according to the fourth embodiment. Here, redundant description of operations overlapping those in FIG. 8 will be omitted.

As illustrated in FIG. 13, in step S401, the eNB 200 transmits configuration information of SPS (SPS Config) to the UE 100 using individual RRC signaling. The UE 100 receives and stores the "SPS Config".

In step S402, the eNB 200 transmits, to the UE 100, DCI (SPS activation instruction) for activating SPS, using the PDCCH. The SPS activation instruction includes scheduling information (UL grant). The UE 100 stores the scheduling information included in the SPS activation instruction.

In steps S403 to S404, the UE 100 performs transmission by SPS. As mentioned above, the UE 100 transmits uplink data to the eNB 200 using the PUSCH according to the scheduling information, at each SPS periodicity (semiPersistSchedIntervalUL). Nevertheless, steps S403 to S404 are not essential, and may be omitted.

In step S405, the eNB 200 transmits DCI for dynamic scheduling (normal DCI) to the UE 100 using the PDCCH. The DCI is masked using normal a C-RNTI. The DCI includes scheduling information (UL grant).

In step S406, in response to the reception of DCI for dynamic scheduling, the UE 100 deletes scheduling information related to SPS, and releases the SPS allocated resource.

In step S407, the UE 100 transmits uplink data to the eNB 200 using the PUSCH, according to scheduling information included in the DCI for dynamic scheduling.

In this manner, according to the fourth embodiment, signaling for releasing the SPS allocated resource can be made unnecessary.

Fifth Embodiment

A fifth embodiment will be described below mainly based on a difference from the first to fourth embodiments.

An uplink radio resource is allocated from the eNB 200 to the UE 100 according to the fifth embodiment, by SPS. Special SPS in which nonperformance of uplink transmission in a transmission opportunity defined according to an SPS periodicity (SPS transmission opportunity) is permitted is configured in the UE 100 by the eNB 200. The "uplink transmission" is PUSCH transmission including not only transmission of uplink data but also transmission of padding data. In normal SPS, the UE 100 needs to always perform uplink transmission in the SPS transmission opportunity. In contrast to this, in the special SPS, nonperformance of uplink transmission in the SPS transmission opportunity is permitted.

Hereinafter, such special SPS will be referred to as "Enhanced SPS". By introducing "Enhanced SPS", SPS can be kept while suppressing power consumption of the UE 100. Thus, SPS can be effectively used for latency reduction of uplink.

If "Enhanced SPS" is configured, and uplink transmission is not performed in the SPS transmission opportunity, the UE 100 omits monitoring of "HARQ ACK/NACK" corresponding to the uplink transmission (i.e., monitoring of PHICH). In other words, if "Enhanced SPS" is configured, non-monitoring of the PHICH corresponding to the SPS transmission opportunity is permitted. The power consumption of the UE 100 can be thereby further suppressed.

The eNB 200 according to the fifth embodiment allocates an uplink radio resource to the UE 100 by SPS. If the eNB 200 configures "Enhanced SPS" in the UE 100, the eNB 200 does not issue a retransmission request to the UE 100 (i.e., does not transmit HARQ NACK to the UE 100) even if the UE 100 does not perform uplink transmission in the SPS transmission opportunity.

Nevertheless, if the eNB 200 does not detect uplink transmission of the UE 100 in the SPS transmission opportunity, it is difficult for the eNB 200 to distinguish whether a reception error has occurred in the eNB 200 or the UE 100 has not actually performed uplink transmission. Thus, if the UE 100 in which "Enhanced SPS" is configured starts uplink transmission in the SPS transmission opportunity, the UE 100 transmits, to the eNB 200, information indicating an uplink transmission start. For example, the UE 100 transmits a MAC control element (MAC CE) including the information indicating the uplink transmission start, together with uplink data. The eNB 200 thereby determines that a reception error has not occurred. In addition, if the eNB 200 does not detect uplink transmission in the SPS transmission opportunity, and then detects uplink data including the "MAC CE". On the other hand, if the eNB 200 does not detect uplink transmission in the SPS transmission opportunity, and then detects uplink data not including the "MAC CE", the eNB 200 determines that a reception error has occurred.

In addition, if the UE 100 performs transmission including the "MAC CE" (information indicating the uplink transmission start), and then does not receive corresponding "HARQ Ack/NACK" (i.e., if the PHICH is not transmitted from the eNB 200), the UE 100 may determine that the transmission is a reception error, and retransmit data including the "MAC CE".

Figure 14:
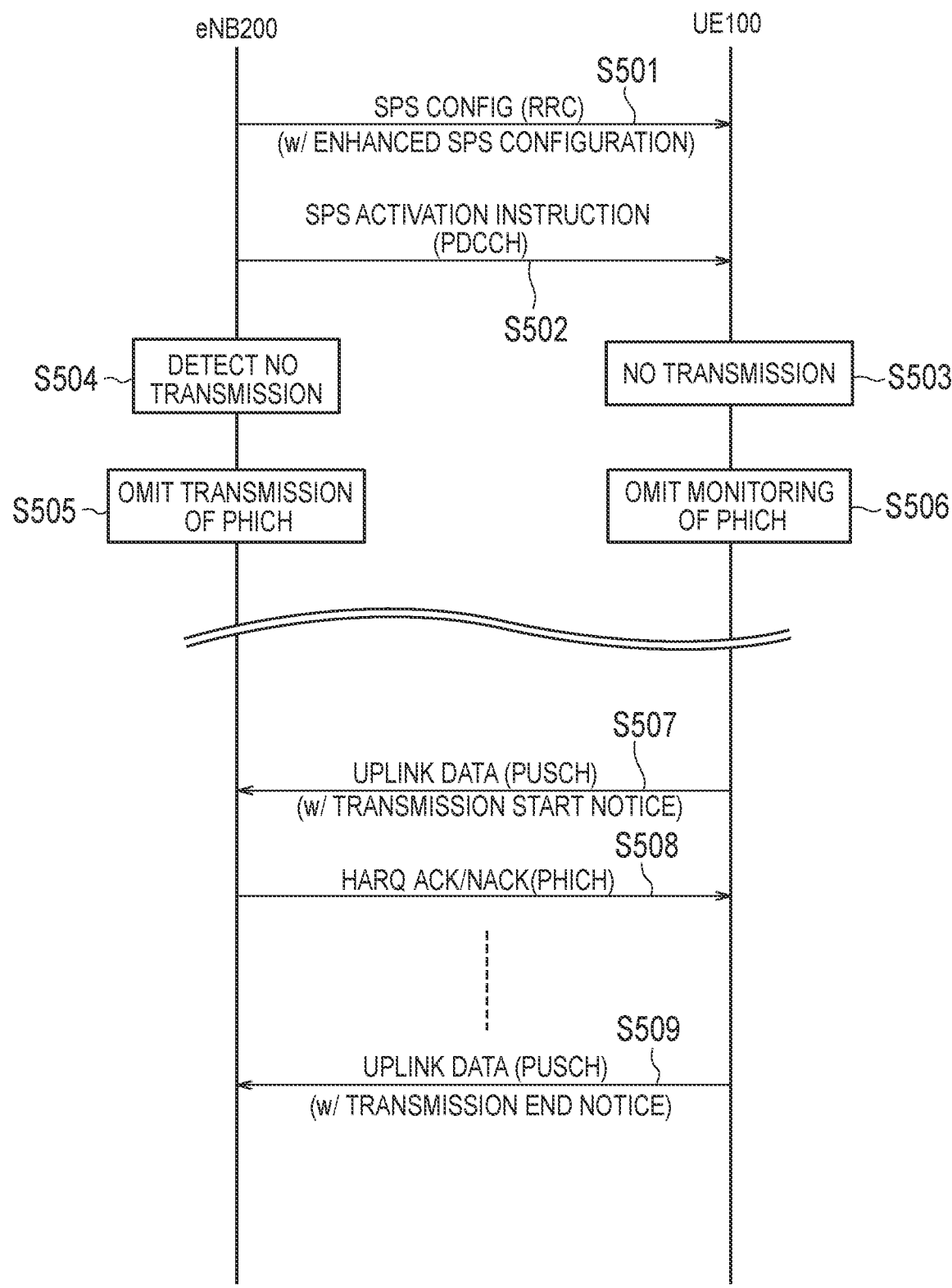
FIG. 14 is a diagram illustrating a sequence example according to a fifth embodiment.

FIG. 14 is a diagram illustrating a sequence example according to the fifth embodiment. Here, redundant description of operations overlapping those in FIG. 8 will be omitted.

As illustrated in FIG. 14, in step S501, the eNB 200 transmits "SPS Config" to the UE 100 using individual RRC signaling. In the fifth embodiment, "SPS Config" includes configuration information of "Enhanced SPS" in addition to various types of configuration information as illustrated in FIGS. 9A and 9B. The configuration information of "Enhanced SPS" may include information indicating that "Enhanced SPS" is to be configured. The configuration information of "Enhanced SPS" may include information indicating whether to continue "Enhanced SPS" after the end of uplink transmission (AfterFinalData). The UE 100 receives and stores the "SPS Config".

In step S502, the eNB 200 transmits, to the UE 100, DCI (SPS activation instruction) for activating SPS (Enhanced SPS), using the PDCCH. The SPS activation instruction includes scheduling information (UL grant). The UE 100 stores scheduling information included in the received SPS activation instruction.

Here, a case in which uplink data to be transmitted to the eNB 200 does not exist in the UE 100 will be assumed. In step S503, the UE 100 recognizes an SPS transmission opportunity, but does not perform uplink transmission in the SPS transmission opportunity because "Enhanced SPS" is configured.

In step S504, the eNB 200 does not detect uplink transmission of the UE 100 in the SPS transmission opportunity. Here, for example, the eNB 200 may detect that the UE 100 has not transmitted the PUSCH, according to the power detection of DMRS in the PUSCH.

In step S505, the eNB 200 omits a retransmission request to the UE 100 (i.e., does not transmit HARQ NACK to the UE 100) because "Enhanced SPS" is configured in the UE 100.

In step S506, because "Enhanced SPS" is configured, the UE 100 omits monitoring of "HARQ ACK/NACK" (i.e., monitoring of PHICH).

The procedure from steps S503 to S506 is continued until uplink data is generated in the UE 100.

Here, a case in which uplink data to be transmitted to the eNB 200 is generated in the UE 100 will be assumed. In step S507, in the SPS transmission opportunity, the UE 100 transmits uplink data to the eNB 200 together with a "MAC CE" including information indicating an uplink transmission start. In response to the reception of the "MAC CE", the eNB 200 detects that the UE 100 has started the transmission of uplink data, and activates PHICH transmission. After the UE 100 notifies the eNB 200 of the uplink transmission start, the UE 100 activates PHICH monitoring.

In step S508, the eNB 200 transmits, to the UE 100, "HARQ ACK/NACK" corresponding to the uplink data received from the UE 100. The UE 100 receives the "HARQ ACK/NACK".

The UE 100 transmits uplink data to the eNB 200 in the SPS transmission opportunity until uplink data becomes nonexistent in a buffer of itself. In addition, the eNB 200 transmits, to the UE 100, "HARQ ACK/NACK" corresponding to the uplink data received from the UE 100.

Here, a case in which the UE 100 transmits the last uplink data to the eNB 200, and uplink data becomes nonexistent in the buffer will be assumed. In step S509, the UE 100 transmits uplink data to the eNB 200 together with a "MAC CE" including information indicating an uplink transmission end. The UE 100 may determine whether to continue "Enhanced SPS", based on the aforementioned AfterFinalData. For example, if "Enhanced SPS" is set to "release", the UE 100 may release the configuration of "Enhanced SPS" in response to the uplink transmission end. In contrast to this, if "Enhanced SPS" is set to "continue", the UE 100 may keep the configuration of "Enhanced SPS" even after the end of uplink transmission.

In addition, in this sequence, the UE 100 keeps "Enhanced SPS" even after the UE 100 notifies the eNB 200 of the uplink transmission start (step S507). Nevertheless, after the UE 100 notifies the eNB 200 of the uplink transmission start (step S507), the UE 100 may shift from "Enhanced SPS" to normal SPS. If the UE 100 shifts to the normal SPS, implicit release of the SPS allocated resource (implicitReleaseAfter) is activated.

Modified Example of Fifth Embodiment

The sequence in FIG. 14 may be modified in the following manner. More specifically, normal SPS is configured in step S501, and "Enhanced SPS" is activated in step S502. More specifically, even if normal SPS is configured in step S501, if an activation instruction of "Enhanced SPS" is issued in step S502, the UE 100 starts the operation of "Enhanced SPS". The activation instruction of "Enhanced SPS" is, for example, DCI to which a new DCI format is applied.

Other Embodiments

As a modified example of the second embodiment, if uplink data does not exist, the UE 100 may receive NACK from the eNB 200 without transmitting uplink data to the eNB 200. In other words, the eNB 200 determines as a reception error, and issues a retransmission request to the UE 100. Then, the UE 100 releases the SPS resource if NACK has been received the number of times corresponding to implicitReleaseAfter.

The aforementioned first to fifth embodiments are not limited to cases in which the embodiments are individually and independently executed. Two or more embodiments of the first to fifth embodiments can be appropriately combined, and executed.

In the aforementioned embodiments, SPS in uplink has been mainly described. Nevertheless, methods according to the aforementioned embodiments may be applied to SPS in downlink.

In the aforementioned embodiments, the LTE system has been described as an example of a mobile communication system. Nevertheless, the present disclosure is not limited to the LTE system. The present disclosure may be applied to a system other than the LTE system.

Additional Statement

1. Introduction

New research items related to the latency reduction technique for LTE have been approved. The purpose of this research is to identify two technical fields for reducing packet data latency as described below.
Fast uplink access solution [RAN2]:
TTI shortening and reduced processing time [RAN1]:
The fast uplink access solution is expected to improve resource efficiency as compared with several practical techniques including keeping current TTI length and processing time, that is, TTI shortening, and several practical techniques not including the maintenance.
In this additional statement, initial study of research related to the fast uplink access solution is provided.

2. Discussion (2.1. Working Hypothesis)
Motivation documents of this research indicate that a current standardized mechanism for uplink resource allocation compresses latent throughput performance of LTE from the viewpoint of TCP throughput. A reduction in TCP throughput is caused by round-trip time latency, that is, a TCP slow start algorithm caused by TCP-ACK transmission in UL. Thus, the fast uplink access solution is expected to improve user experience provided by a higher layer structured in a TCP layer. For the working hypothesis, SID mentions the fast uplink access solution.
The research field includes resource efficiency including air interface capacity, battery lifetime, a control channel resource, specification impact, and technical possibilities. Both an FDD duplex mode and a TDD duplex mode are considered.
As a first aspect, latent gains such as a reduced response time and improved TCP throughput that are caused by latency improvement related to typical applications and use cases are identified and documented. In this evaluation, the RAN2 can hypothesize a latency reduction caused by protocol strengthening, similarly to shortened TTI. In conclusion, this aspect of this research indicates which latency reduction is desirable [RAN2].
The solution is expected to improve network capacity, UE power consumption, and a control channel resource. In particular, improved TCP throughput can be considered as a major performance indicator.
Observation 1: DL TCP throughput is expected to be improved by UL latency reduction solution.
In the case of an aspect specific to the fast uplink access solution;
Attention is to be paid to reducing user plane latency for scheduled UL transmission for an active UE and a UE that has been nonactive but been kept in an RRC connection connected for a long time, and obtaining solution having higher resource efficiency according to protocol strengthening and signaling strengthening, as compared with pre-scheduling solution permitted by an existing standard for both of keeping and not keeping the current TTI length and processing time.
The active UE is assumed to consecutively transmit/receive data. Thus, the UE is considered to be in an active time. In other words, DRX is not applied because a non-active timer is operating.

Observation 2: a UE in the active time is considered.
The UE that has been in non-active but been kept in the RRC connected for a long time can be interpreted as needing to transmit at least an SR and a BSR for the UE applying a long DRX cycle and executing uplink transmission. Furthermore, if a time alignment timer TAT ends, the UE starts a random access procedure before the SR transmission. This reduces user experience, that is, an actual response time.
Observation 3: a UE including application of a long DRX cycle and not having UL permission is considered.
Observation 4: if the UE is in non-active for a long time, the time alignment timer can end.
Even if the current TTI length and processing length are assumed, the fast uplink access solution should have higher resource efficiency as compared with the pre-scheduling solution. The TTI shortening is more general solution, and is expected to reduce latency of not only downlink delivery but also of uplink access latency, owing to increased HARQ interaction.
Observation 5: fast uplink solution has gains independent of a TTI shortening approach.
The motivation documents describe that possible approaches for fast uplink access are based on pre-scheduling being a practical technique, and an eNB allocates an uplink resource before SR reception according to the pre-scheduling. Nevertheless, even if a UE does not include uplink data to be transmitted, the pre-scheduling technique consumes radio resources in an uplink control channel (i.e., PUSCH) and a downlink control channel (i.e., PDCCH). It is also discussed that, if existing SPS is used for pre-scheduling, the UE needs to transmit padding data for avoiding implicit release of a configured SPS resource. Thus, the motivation documents propose that a standardized approach is expected to strengthen the pre-scheduling technique. This can include non-padding in a case in which prior permission, mechanisms similar to SPS, and data are not available, and/or a smooth shift to dynamic scheduling.
Observation 6: the standardized approach is expected to strengthen resource efficiency as compared with the practical techniques.

Figure 16:
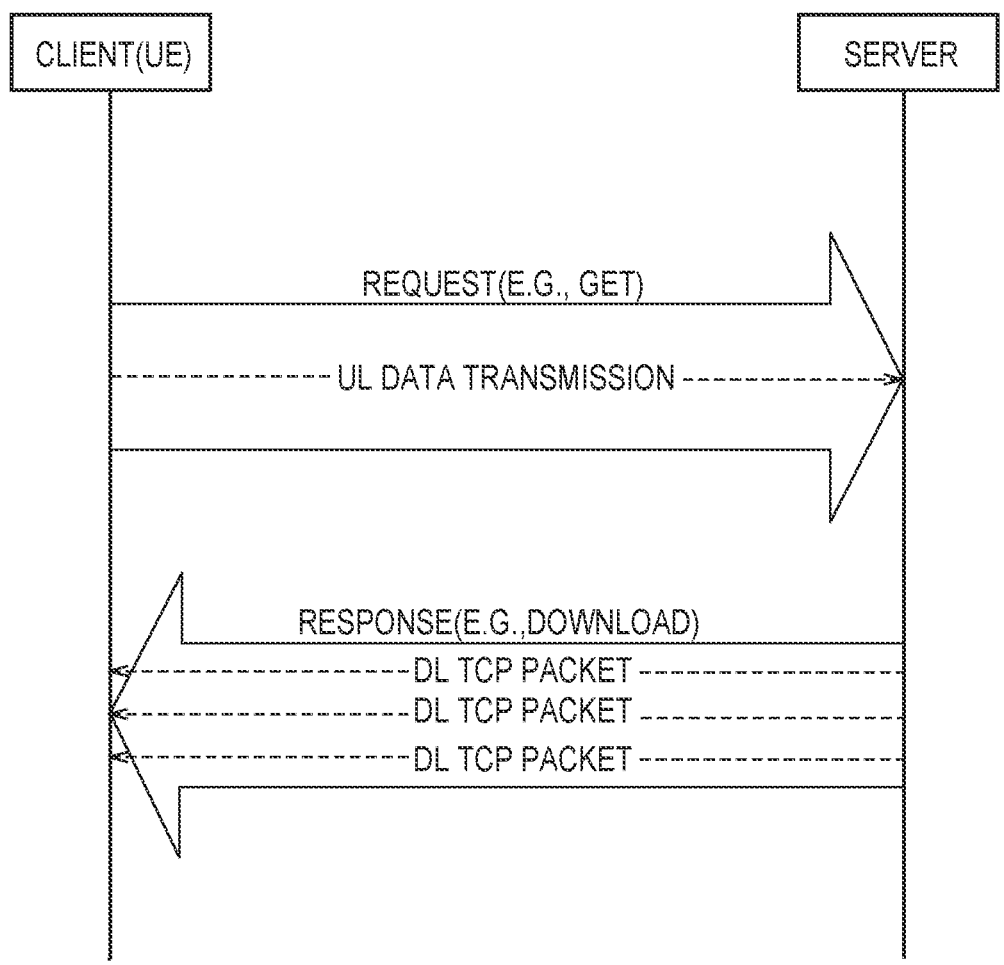
FIG. 16 is a diagram according to the additional statement of the embodiment.

(2.2. Typical Use Case)
A recent increase in mobile traffic is caused by the growth of mobile video traffic, and according to a public report, this tendency is predicted to dominate future traffic. It is well-known that video streaming typically uses TCP (HTTP by TCP) except for live streaming (by UDP). Thus, the case of using video streaming conforms to the range of this research.
In addition, the report points out that social networking and web browsing are the second most dominant applications of mobile traffic, and these applications are therefore typically structured by HTTP, and accordingly use TCP. As many 3GPP representatives already communicate, 3GPP FTP service can be consecutively accessed by each representative for downloading Tdocs used by TCP. Thus, behaviors in applications structured in HTTP or FTP should be considered to be those in the typical use case.
Proposal 1: user behaviors in applications structured in HTTP and FTP should be considered to be those in the typical use case in this research.
FIG. 15 is a diagram illustrating top five applications in mobile traffic volume and mobile application analysis.
The most typical behavior in such applications can be modeled as a request/response dialogue. For example, if a user desires to download a file using the FTP, a client first transmits an RETR command (also known as, GET) to a server, and after that, file download starts. The same behavior can also be applied to the HTTP. With this configuration, as illustrated in FIG. 16 as an example, an web browser first transmits GET, and after that, an web page is downloaded when the user opens the web page. If typical behaviors are considered, the RAN2 needs to discuss whether initial uplink data transmission preceding a corresponding DL TCP packet (e.g., request such as GET) is simply assumed, or strengthening should be performed also in the fast uplink access solution.

Proposal 2: the RAN2 needs to discuss whether initial uplink data transmission preceding a corresponding DL TCP packet is simply assumed, or strengthening should be performed also in the fast uplink access solution.

FIG. 16 is a diagram illustrating modeling in the typical use case that uses the HTTP/FTP.

(2.3. Essential Issue)

As mentioned in 2.1, serious issues leading to uplink access latency cannot be solved by any of the pre-scheduling technique, or a prior permission technique that uses strengthened SPS. FIG. 17 illustrates, as examples, three serious issues to be dealt with by the fast uplink access solution (refer to FIG. 17).

Serious Issue 1: DL Transfer Delay

The DL transfer delay is caused by a long DRX cycle. At worst, a service providing cell needs to wait 10 to 2560 subframes for a transmission opportunity after DL TCP packet reception.

Serious Issue 2: Too Early/Late Allocation

Too early allocation can be caused by the pre-scheduling technique or a prior permission approach preceding SR reception. On the other hand, too late allocation can be caused by allocating uplink resources for a TCP ACK packet (accordingly, seven subframes subsequent to SR transmission of UE) according to an SR periodicity, that is, SR periodicity*sr-ProhibitTimer, or based on too-simple scheduler execution, that is, corresponding BSR reception.

(Serious Issue 3: Too Much/Less Allocation)

Too much/less allocation can be caused by the pre-scheduling technique or a prior permission approach preceding a BSR. The scheduler needs to idolatrously allocate uplink resources without knowing a buffer status of the UE.

Serious Issue 4: Initial Uplink Delay

As mentioned in Observation 4, if the TAT ends, the UE should start the random access procedure before all uplink transmissions.

As a matter of course, wise application techniques can reduce some of negative impacts caused by the three serious issues, such as, for example, understanding inside of DL IP packet, and allocating uplink resources based on the use of previous uplink permission. Nevertheless, the standardized approach is expected to solve almost all of the above-listed issues, but not all the issues.

Proposal 3: DL transfer delay, too early/late allocation, too much/less allocation, and a TAT end should be optimized by the fast uplink access solution.

(2.4. Latent Solution Approach)

As discussed in 2.3, the serious issues are never solved unless the DRX, SR, BSR, and/or procedures are reconsidered. These issues are never dealt with even if the prior permission approach that uses strengthened SPS is applied. This is because mismatch between actual permission and ideal allocation (FIG. 17) causes a reduction in resource efficiency including air interface capacity, battery lifetime, and a control channel resource.

Observation 7: the prior permission approach can have good performance as compared with the existing practical techniques, but never solves these serious issues.

For solving these serious issues, the following solution approaches can be considered.

For example, expanded OnDuration handling in DRX for fast DL allocation that is triggered by initial UL transmission (i.e., GET).

For example, a reduction of signaling round trip for initial UL packet transmission that is caused by the integration of the SR and the BSR.

A shorter SR periodicity with less impact on spectral efficiency [RAN1].

For example, RACH procedure strengthening that uses an additional function for UL data permission.

Thus, the RAN2 should research not only the UL permission mechanism itself, but also procedures related to UL permission.

Proposal 4: the RAN2 should also research strengthening of DRX, SR, BSR, and RACH.

3. Conclusion

In this additional statement, the working hypothesis has been discussed based on the description of the approved working items. The typical use case and modeling thereof are provided. The four serious issues and latent solution approaches are identified for this research.

The invention claimed is:

1. A radio terminal to which uplink radio resources are allocated from a base station by Semi-Persistent Scheduling (SPS), the radio terminal comprising:
   a receiver configured to receive configuration information from the base station, the configuration information indicating that nonperformance of uplink transmission in a transmission opportunity defined according to an SPS periodicity is permitted;
   a transmitter configured to, after receiving the configuration information, perform uplink transmission in a transmission opportunity defined according to the SPS periodicity in response to data to be transmitted to the base station existing; and
   a controller configured to, after receiving the configuration information, skip uplink transmission in a transmission opportunity defined according to the SPS periodicity in response to data to be transmitted to the base station not existing, wherein
   the controller is configured to deactivate an implicit SPS release function in response to receiving the configuration information, wherein the implicit SPS release function uses empty data transmission to indicate release of the SPS.

2. A radio communication method, comprising:
   allocating radio resources from a base station by Semi-Persistent Scheduling (SPS);
   receiving configuration information from the base station, the configuration information indicating that nonperformance of uplink transmission in a transmission opportunity defined according to an SPS periodicity is permitted;
   performing uplink transmission in a transmission opportunity defined according to the SPS periodicity in response to data to be transmitted to the base station existing, after receiving the configuration information;
   skipping uplink transmission in a transmission opportunity defined according to the SPS periodicity in response to data to be transmitted to the base station not existing, after receiving the configuration information; and deactivating an implicit SPS release function in response to receiving the configuration information, wherein the implicit SPS release function uses empty data transmission to indicate release of the SPS.

3. A processor for a radio terminal to which uplink radio resources are allocated from a base station by Semi-Persistent Scheduling (SPS), the processor configured to execute processes of:

receiving configuration information from the base station, the configuration information indicating that nonperformance of uplink transmission in a transmission opportunity defined according to an SPS periodicity is permitted;

performing uplink transmission in a transmission opportunity defined according to the SPS periodicity in response to data to be transmitted to the base station existing, after receiving the configuration information;

skipping uplink transmission in a transmission opportunity defined according to the SPS periodicity in response to data to be transmitted to the base station not existing, after receiving the configuration information; and deactivating an implicit SPS release function in response to receiving the configuration information, wherein the implicit SPS release function uses empty data transmission to indicate release of the SPS.

* * * * *